(12) United States Patent
Sarria

(10) Patent No.: US 8,307,896 B2
(45) Date of Patent: Nov. 13, 2012

(54) TWO-CONCENTRIC PIPE SYSTEM TO HEAT FLUIDS USING THE EARTH'S INTERIOR THERMAL ENERGY (DEEP)

(76) Inventor: Alberto Sarria, Bogotá (CO)

( * ) Notice: Subject to any disclaimer, the term of this patent is extended or adjusted under 35 U.S.C. 154(b) by 233 days.

(21) Appl. No.: 12/718,546

(22) Filed: Mar. 5, 2010

(65) Prior Publication Data

US 2010/0270003 A1 Oct. 28, 2010

Related U.S. Application Data

(60) Provisional application No. 61/172,968, filed on Apr. 27, 2009.

(51) Int. Cl.
*E21B 43/24* (2006.01)
*E21B 36/00* (2006.01)
*F03G 7/00* (2006.01)

(52) U.S. Cl. .... 166/272.1; 166/302; 166/57; 166/241.6; 48/61; 48/197 R; 60/641.2; 165/45

(58) Field of Classification Search .......... 48/61, 197 R; 60/641.2–641.5; 165/45; 166/57, 272.2, 166/242.1, 241.1, 241.2, 241.6, 302, 267, 166/268, 272.1

See application file for complete search history.

(56) References Cited

U.S. PATENT DOCUMENTS

| | | | | |
|---|---|---|---|---|
| 4,325,228 A * | 4/1982 | Wolf | .............................. | 62/260 |
| 4,328,858 A * | 5/1982 | Richter et al. | .................. | 165/45 |
| 4,512,156 A * | 4/1985 | Nagase | ........................ | 60/641.2 |
| 4,574,875 A * | 3/1986 | Rawlings et al. | ............... | 165/45 |
| 4,671,351 A * | 6/1987 | Rappe | ........................... | 165/133 |
| 4,776,169 A * | 10/1988 | Coles, Jr. | ..................... | 60/641.2 |
| 5,095,705 A * | 3/1992 | Daly | ............................. | 60/641.2 |
| 5,339,890 A * | 8/1994 | Rawlings | ....................... | 165/45 |
| 5,862,866 A * | 1/1999 | Springer | ........................ | 166/380 |
| 6,259,165 B1 * | 7/2001 | Brewington | ................. | 290/1 A |
| 6,668,554 B1 * | 12/2003 | Brown | ........................ | 60/641.2 |
| 6,708,494 B1 * | 3/2004 | Hamann | ....................... | 60/641.3 |
| 7,377,122 B2 * | 5/2008 | Kidwell et al. | ................. | 62/260 |
| 7,582,269 B2 * | 9/2009 | McGrew | ....................... | 422/606 |
| 8,001,784 B2 * | 8/2011 | Marshall | ....................... | 60/641.2 |
| 2005/0061472 A1 * | 3/2005 | Guynn et al. | ................... | 165/45 |
| 2007/0127310 A1 * | 6/2007 | Metcalfe et al. | ............... | 366/230 |
| 2007/0223999 A1 * | 9/2007 | Curlett | ............................ | 405/55 |
| 2008/0169084 A1 * | 7/2008 | Bullivant | ........................ | 165/45 |
| 2008/0209933 A1 * | 9/2008 | Kidwell et al. | ................. | 62/260 |
| 2008/0289795 A1 * | 11/2008 | Hardin et al. | .................. | 165/45 |
| 2009/0013690 A1 * | 1/2009 | Marshall | ...................... | 60/641.2 |
| 2009/0126923 A1 * | 5/2009 | Montgomery et al. | ......... | 166/57 |

(Continued)

FOREIGN PATENT DOCUMENTS

JP 2001004232 A * 1/2001

(Continued)

*Primary Examiner* — Jennifer H Gay

(74) *Attorney, Agent, or Firm* — Neifeld IP Law, PC

(57) ABSTRACT

A method and apparatus for heating fluids using the Earth's inner heat to generate power and desalinate water. Fluids include fresh water and sea water to be desalinized. The method involves passing a filtered fluid down a channel formed by two concentric tubes in a deep well defining inner and outer channels, to a depth at which the fluid reaches the needed temperature. Hot fluids pass into an inner channel and flow to surface with small heat loss, through an insulated pipe. The hot fluid may be vaporized to produce power, and returned to the system when condensed, forming a closed system, or it may be desalinize seawater in an integrated process that also produces electrical power.

15 Claims, 14 Drawing Sheets

U.S. PATENT DOCUMENTS

| | | | | |
|---|---|---|---|---|
| 2010/0270003 A1* | 10/2010 | Sarria | | 165/45 |
| 2011/0011557 A1* | 1/2011 | Shelton, Jr. | | 165/45 |
| 2011/0067399 A1* | 3/2011 | Rogers et al. | | 60/641.2 |
| 2011/0220341 A1* | 9/2011 | Kidwell | | 165/200 |
| 2011/0224942 A1* | 9/2011 | Kidwell | | 702/136 |
| 2011/0232795 A1* | 9/2011 | Hardin | | 138/111 |
| 2011/0232858 A1* | 9/2011 | Hara | | 165/45 |
| 2011/0259547 A1* | 10/2011 | Kidwell et al. | | 165/45 |
| 2011/0308268 A1* | 12/2011 | Krimsky | | 62/260 |
| 2012/0031616 A1* | 2/2012 | Hall | | 166/302 |

FOREIGN PATENT DOCUMENTS

| | | | | |
|---|---|---|---|---|
| JP | 2007139370 A | * | 6/2007 | |
| JP | 2007321383 A | * | 12/2007 | |
| JP | 2010261633 A | * | 11/2010 | |

* cited by examiner

DETAIL 200

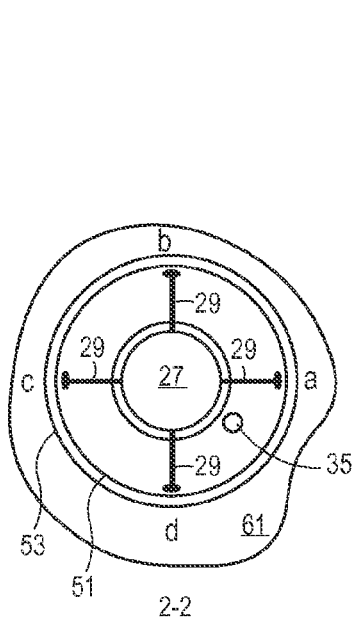
FIG. 3B
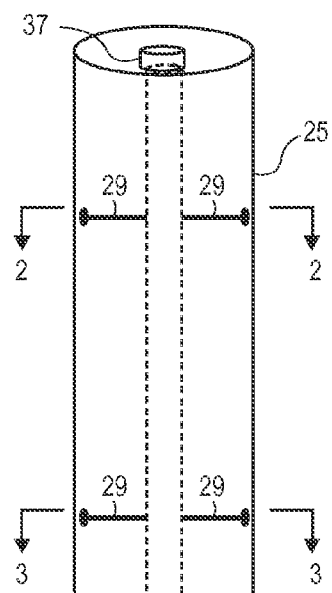
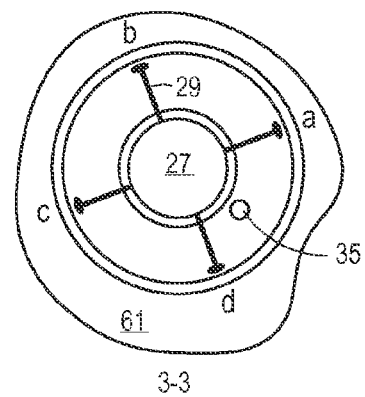
FIG. 3C
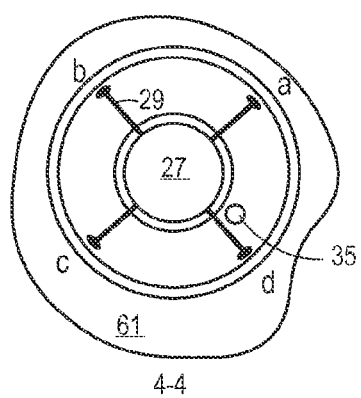
FIG. 3D
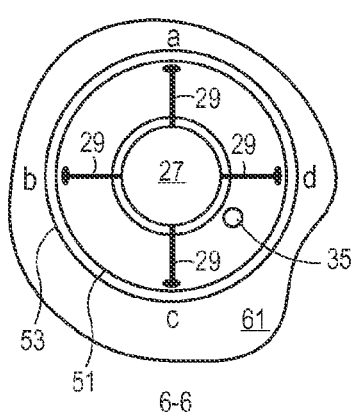
FIG. 3F
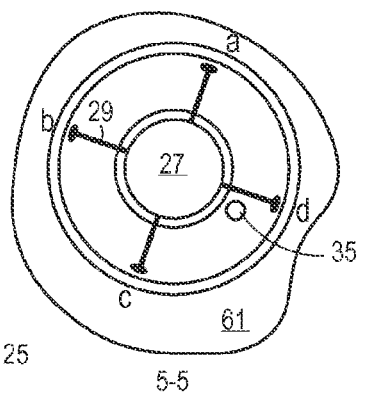
FIG. 3E
FIG. 3A

DETAIL 400
PLAN VIEW IN THE UPPER PART AND
VERTICAL SECTION IN THE LOWER PART.
(DRAWING NOT TO SCALE)

TWO-CONCENTRIC PIPE SYSTEM TO HEAT FLUIDS USING THE EARTH'S INTERIOR THERMAL ENERGY (DEEP)

CROSS REFERENCE TO RELATED APPLICATIONS

This application claims the benefit of U.S. Provisional 61/172,968, filed Apr. 27, 2009, which is incorporated herein by reference in its entirety.

FIELD

Geothermal energy is used to heat water or other liquids to generate electric power and/or desalinize seawater

BACKGROUND

Dependence on energy and on potable water is an old concern of humanity. Energy and potable water demands have increased notoriously in the last few decades, and global warming is a problem that all nations understand must be addressed or future of humanity could be compromised.

Generating energy and producing potable water generally require burning hydrocarbons that contribute to the global warming problem. Until very recent times, coal, gas, petroleum, nuclear and hydropower have been the main sources of electric energy generation. Hydropower is a relatively small source of renewable energy.

Global warming, geo-politics and the possibility of exhausting the world's hydrocarbon deposits, have stimulated research on renewable energy sources. Both hydrothermal and wind are renewable sources of energy which have been used in the past; wind for several hundred years, and geothermal for about a century. For the past few decades several approaches to solar energy transformation to electricity have been used. In recent years great efforts have been made by scientists and engineers around the world to lower the technical and economic barriers to broaden use of winds, ocean waves, tides, solar radiation and the internal heat of the earth as alternative sources for renewable energy. However, there is a need for further improvements. The invention relates to a novel way of tapping the earth's internal heat energy to generate electricity while also providing potable water from the sea.

Humanity Urgently Needs Fresh Water and Electrical Energy

There is a severe shortage of drinking water in many regions of the world and this situation will grow worse as population increases. Although the rate of population growth has been decreasing, it still remains high. By 2050 the global population is expected to be near nine thousand million (9 billion) Sachs [1].

The dry land surface of the earth has doubled since 1970. According to the Intergovernmental Panel on Climate Change, by 2050 this trend will worsen to the point of impacting food production. Growing one pound of wheat requires 520 liters of water, and growing a pound of rice requires 10,000 liters of water.

Underground water levels have decreased in many areas. For example, in some places bored wells that once hit water at 6 meters now must go down to about 24 meters. This problem is becoming more frequent around the world and is causing complicated migrations of people from dry lands.

At the present time about 350 million people live within 10 kilometers of a coast and about 3350 million, or approximately half of the world's population, live within 100 kilometers.

Scientists and engineers have tried to increase the availability of drinking water in different zones of the earth by modifying the local rain regime or by desalinating seawater. In the first case success has been relatively low, the latter has been done on a routine basis for a long time and its importance is growing.

There are three methods now in commercial use for sea water desalination. The first method employs evaporation and condensation of water in nuclear reactors. The second method employs evaporation and condensation of water heated using externally supplied electric power. In the third method, seawater is pressurized and passed through membranes which retain salts.

In all three methods the salts are extracted and returned to the sea or taken to special disposal areas on land. All of these methods are heavy consumers of energy supplied from external sources.

Desalination systems based on evaporation or osmosis techniques can be installed along most coastal regions of the world, provided that the electric power necessary for their operation is available.

In some regions of the world desalination is the main source of drinking water for millions of people, because there are few rivers and ground water is scarce or too deep. For instance, the Persian Gulf region has made significant investments in desalination systems and several are under construction to increase the supply of drinking water for its growing population. Something similar occurs in parts of the United States and other countries.

Some areas of the world are very dry due to low average annual rainfall, while other regions are very humid. Some areas that used to be fertile with abundant flora and fauna are now deserts. Rainfall, essential for life, is part of a larger phenomenon involving sea, air and the surface of the planet. This system is called the hydrologic cycle.

The sun's rays heat the sea surface and evaporate water. The water vapor moving by the action of the winds, change its temperature and pressure. Air masses ascend and cool forming droplets which fall as rain. Part of the water that falls evaporates; some infiltrates and some run off to the rivers that take it to the sea to continue the hydrologic cycle.

The hydrologic cycle involves complex physical phenomena where the atmospheric pressure and temperature, in addition to the global topography, are key variables. The sea temperature is also important and of lower relative importance is the surface temperature of the earth.

Temperature of the seawater varies from approximately 4° C. at the very deep ocean floor or polar seas, to 36° C. in some special areas of tropical seas. The seawater temperature depends largely on the broad range of factors from the atmosphere temperature and of the global ocean currents.

Energy supply is necessity for welfare of humankind. At the present time most energy consumed in the world comes from burning hydrocarbons. There is a growing participation of renewable energies, such as solar and wind sources. Hydropower and traditional geothermal generations are minor components in total energy annually produced. Huge annual investments are necessary to cope with the increasing demand for energy.

The Earth's Interior Thermal Energy

The earth's interior temperature varies from a few degrees ° C. on the surface to about 4200° C. at its center. Volcanoes are a demonstration of the earth's internal heat. The average surface temperature of the solid earth is about 10° C. and that of the sea floor is a little higher than 4° C.

The ratio of temperature to depth is the thermal internal gradient of the earth. It is expressed in degrees Celsius per kilometer (° C./km). The temperature rises rapidly with depth on the outside part of the earth's crust. This rate of increase declines at great depths, Press [2], Skinner et al [3]. The thermal gradient may vary from one site to another. Liyuang et al [4] have made careful measurements in a China drilling project where they found an average thermal gradient of 30° C./km for the first few kilometers of the earth's crust.

Analytical methods are used to estimate the earth interior temperature in terms of depth, varying some properties of the rock. Thermal gradients in different regions have been confirmed in oil drilling and in some special drillings made to investigate the earth's crust properties. The temperature change has also been confirmed in deep mines. Thermal flow is a slow process in the earth, due to the low thermal conductivity of rock.

The measurements allow deducing an average thermal gradient of 30° C./km for the first 10,000 meters to 20,000 meters of the earth's continental crust. The depth corresponds to measurements in land made from the medium sea level.

There is a very small heat loss due to radiation through the earth's surface. In spite of that radiation the earth's internal temperature remains almost constant. This is due to the heat liberated by radioactive materials such as thorium and uranium distributed in the interior of the planet. During the next million years the internal heat of the earth will remain more or less constant, Karato [5].

This virtually endless supply of internal heat combined with the huge amount of water in the oceans provides the potential for a new geothermal application to benefit humanity.

The Global Distribution of Water and Desalination

The earth's water is distributed approximately as follows: 97.3% in the oceans, 2.1% frozen at the poles, 0.6% in the more or less superficial groundwater, while lakes and rivers account for 0.2%. The atmospheric water vapor represents a very small proportion. It is estimated that the water of the planet corresponds to a volume of 1370 million cubic kilometers, USGS [6].

The minimum annual water consumption for an average person is the amount needed for drinking and daily needs, plus that necessary to produce a subsistence diet. This consumption level is close to one thousand cubic meters per year, Rogers [7]. By the year 2050 the planet's population could require about 9000 cubic kilometers of water for its subsistence. This is a negligible part of the total volume of available water on the earth.

The total amount of water on the planet and the annual consumption level for the human population show that the problem is not in the quantity of water but in its distribution in relation to the concentration of the population.

There are regions with abundant fresh water and others with chronic shortages that are increasing with time. There are regions with scarce fresh water but rapidly growing populations. Great efforts have been made in many coastal zones of the world to desalinize seawater as a solution to the shortages.

The salinity of water varies among different seas and even in the same sea. The salinity depends on local conditions such as temperature and water currents.

Desalination of seawater by evaporation in successive stages, and by passing it through membranes under pressure to retain the salt, allow for an economic large scale drinking water supply. These methods are the more favorable for marine water with variable salinity. They have been employed for decades and require large capital investments to construct the necessary facilities, and they incur ongoing expenses for large quantities of electric power.

Nuclear energy is also employed for desalination. In this method the desalinated water is a byproduct of electric power generation. New procedures in the future will reduce the cost of desalination by these methods.

In all the desalination processes, salts must be disposed of with minimum environmental impact. One possibility is to return the salts to the sea. Disposing of the salts may represent a significant cost in the desalination process, regardless of the desalination procedure Besides the capital cost incurred in seawater desalination projects construction, electricity consumption represents an important component of the operating cost. The expense to generate electric power has both direct and indirect components. The direct cost is that to produce the energy itself. The indirect cost is that due to gases produced in coal or hydrocarbon burning by thermal plants, which contribute to global warming.

Desalination by evaporation in multiple stages (MSF) or by the multiple distillation method (MEF) require, on average, from 3 to 7.8 kilowatt-hours (kWh) to desalinize one cubic meter, Udono [8]. Most desalination systems consume electric power generated in plants that employ coal or fossil fuels as the thermal source.

Reduced environmental impact favors new seawater desalination procedures that do not use commercial electric power. Changing the proportion of energy production from traditional to alternative sources requires time and large financial efforts, National Petroleum Council [9].

Energy production in the world is distributed approximately as follows: 38% is obtained from oil, 23% is obtained from gas, 23% is obtained from coal, 7% is obtained in nuclear reactors, and 9% corresponds to renewable sources. Most scientists, engineers and leaders of the world today accept that there is a global warming phenomenon due, in part, to the burning of hydrocarbons to produce electricity.

Earth's Internal Temperature as a Source of Renewable Energy

At present very little of our renewable energy is made from geothermal sources produced by the internal heat of the planet. Traditional geothermal electric power generation is possible in regions with special thermal regimes, produced by intense activity of the internal forces of the earth near the surface. Electric power generation by means of traditional geothermal processes has the great advantage of its minor contribution to global warming.

In traditional geothermal electric power generation, water is forced to circulate to an appropriate depth and is vaporized or partially vaporized. The steam and hot water obtained are forced through a turbine and then are recycled. A production well and an injection well are necessary to obtain the heated fluid. About 30% of the pressurized injected water is recovered to produce electric power; this represents a relatively low efficiency. The traditional procedure does not desalinize water because it is restricted to very special zones of the planet.

Thousands of kilometers have been drilled by the oil industry. By the end of 2008 a well with depth of almost 10 kilometers was finished in the Gulf of Mexico. With the current drilling technology the use of geothermal energy based in very deep drilling becomes a real possibility. In the traditional geothermal electric power generation the maximum depth wells do not surpass a few thousands of meters, but in order to use what is called dry rock geothermal energy, efforts are being made to go down to ten thousand meters. With depth increasing, the drilling becomes very complex due to high temperatures and pressures and to the large diameter of the well.

To heat up water inside the dry rock, the thermal energy transfer must be stimulated with the presence of enough natural fractures or porosity in the rocky medium. If this is not the case, artificial methods like fracturing the rock can be used to circulate injected water to some volume around the geothermal region employed to heat water to produce electricity [10].

SUMMARY OF THE INVENTION

An object of the invention is to provide a method for heating fluids using the earth's internal energy, comprising:
  passing filtered fluid down a drilled well, containing two concentric tubes that form inner and outer channels, to a depth at which the fluid is heated to a specified temperature due to heat transferred from surrounding rock,
  passing heated and pressurized fluid to an inner channel through slots located near the lower part of the inner channel,
  passing heated fluid to the surface through said inner channel where it may be used for power generation, or for seawater desalination in an integral process with power generation,
  controlling pressure of the ascending fluid with a valve located in the upper end of the system and a pump near the beginning of the fluid transit in the system,
  controlling amplitude of horizontal vibrations of an internal tube with separators attached to the internal tube's external wall and supports that allow construction of a heavy internal tube,
  providing for installation of the internal tube with an electro hydraulic breaking and positioning subsystem attached to the external wall of the internal tube,
  optionally promoting heat transfer from surrounding rock by secondary directional drillings used to micro fracture the rock and then moving water through secondary drillings.

Another object of the invention is to provide an apparatus for heating fluids with earth's internal energy, comprising:
  two concentric tubes for passing filtered fluid down a drilled well, forming inner and outer channels, to a depth at which the fluid is heated to a specified temperature due to heat transferred from surrounding rock,
  slots for passing heated and pressurized fluid to an inner channel located near the lower part of the inner channel,
  an inner channel for passing the heated fluid to the surface where it may be used for power generation, or for seawater desalination in an integral process with power generation,
  a valve located in the upper end of the system for controlling pressure of the ascending fluid and a pump near the beginning of the fluid transit system,
  separators attached to the internal tube's external wall, and supports that allow construction of a heavy internal tube, thereby controlling the amplitude of horizontal vibrations of the internal tube,
  an electro hydraulic breaking and positioning subsystem attached to the external wall of the internal tube for installation of the internal tube,
  optional secondary directional drillings promoting heat transfer from surrounding rock by moving water.

Another object of the invention is to provide two concentric tubes inside a deep drilled well. The external tube is the well's casing and the internal pipe is a special double wall tube with separators from the casing to obtain self-control of horizontal vibrations. The internal tube is formed screwing segments of an appropriate length. The weight of the internal tube limits the possibility of installing hanged from surface and a special system must be provided.

Fluid fed by a pump trough the space between the two tubes flows downward and is heated by the thermal energy transferred by the rock whose temperature increases with depth. A number of slots in lower part of the internal tube walls allow the heated fluid to pass in to flow upward to the surface. Heat losses are reduced by a low thermal conductivity fiberglass between the tube two walls. Fresh water, seawater or other fluids can be heated while flowing down the earth's upper crust through the tube system. The system can be open or closed depending on the application.

A main application of the invention is to generate power in a non-contaminating/zero-emissions process. Another main application is to desalinize seawater in an integrated process with power generation. The two concentric tubes system may also be used to improve power generation in traditional geothermal procedures.

BRIEF DESCRIPTION OF THE FIGURES

FIG. 3A: Vertical position of the separators in an interior tube segment, FIG. 3B, FIG. 3C, FIG. 3D, FIG. 3E, FIG. 3F, are sections 2-2 to 6-6, respectively, showing the separator change of position in its horizontal plane. This figure shows how the separators change horizontal position by four angle changes to complete a 90° cycle. The tips a, b, c and d of the separators location from one plane to next are shown in sections 2-2 to 6-6. The drawings are not to scale.

DETAILED DESCRIPTION OF THE INVENTION

Figure 1A:
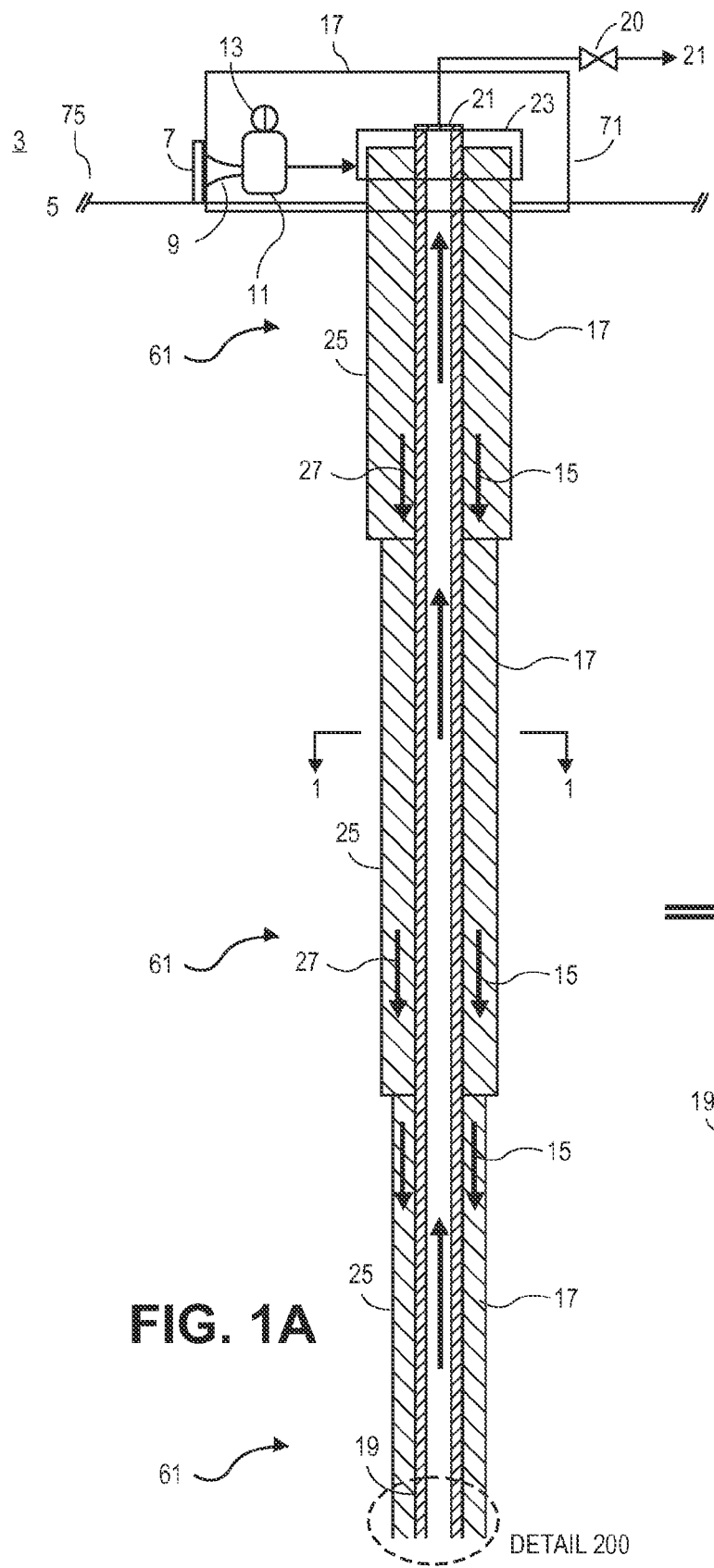
FIG. 1A: Vertical view of the basic system scheme and FIG. 1B detail 200. Drawing is not to scale. This figure shows the essence of the invention two tubes to heat fluids that may be used to generate power or to desalinize seawater in an integral process with power generation. Drawing is not to scale.

The short name DEEP means: Desalination and Electric Power generation. The general procedure comprises:

passing a fluid, such as fresh water, sea water, a hydrofluourocarbon refrigerant (e.g., HFC-23, HFC-134a and HFC152a), isobutene or methylene chloride, through the space between two concentric tubes situated to absorb thermal energy from the earth. At a certain depth the fluid is heated enough to boil at ambient pressure. To preempt boiling, the fluid is generally pressurized all along its way.

passing the heated and pressurized fluid into the internal tube through is passageways in the inner pipe in the lower part of the tube.

returning the heated and pressurized fluid to surface trough the insulated inner part of the double wall tube passing the heated and pressurized fluid to an insulated pipe that conveys the fluid to the point where applications are built to offset head losses and preempt the boiling possibility the incoming fluid must be pressurized by a pump located at surface. A minimum pressure is always present due to the combined action of the pump at the beginning and a valve at the end of the fluid way external tube is the casing of a deep well with maximum diameter at surface and minimum at the bottom internal tube is a special component of the system whose characteristics are such that amplitude of horizontal vibrations are self controlled and has the possibility to install without requiring a large crane Possible applications by means of the appropriate operations passing the steam trough a turbo generator to obtain power to re-circulate the condensed fluid to the two tubes system to form a closed circuit where fluid losses are reduced to a minimum other application is to pass seawater through the tubes with the necessary pressure to maintain it liquid. Once heated by the rock's thermal energy is taken to surface where a decompression yields steam to operate the turbo generator salts would be extracted when steam is formed and thrown to the sea to obtain desalinized sea water whose taste would be improved with chemical products addition external components such as surface structures, bottom or auxiliary pumps, turbine, generator, surface pipes, substation, civil constructions and other appendages are necessary for power generation or desalination of sea water.

The invention is an innovative procedure to heat freshwater, seawater or other appropriate fluid by pumping it through the space between two concentric tubes in a deep well, drilled inland or along the shore of a shallow sea. External tube is the steel casing of the well. Internal tube is a special double wall pipe formed by joining many segments. The inner pipe is double walled to minimize heat transfer between the fluid the flows upward and the fluid the travels downward. Some segments in the lower part have the two walls perforated to form slots allowing the hot fluid to pass in and flow upward to surface through the internal tube.

The two tubes, the main pump and the components that are later described form the basic system that conform the invention. The basic system may be used for applications including but not limited to power generation and seawater desalination.

The well's depth depend on the local thermal regime of the earth's interior that varies from an average minimum of about 20° C./km or less to an average maximum of about 50° C./km or more. Well's depth must be the required for the fluid to heat up to the appropriate temperature to return to the surface with enough energy to produce power or allow a desalination process at surface by vapor condensation if seawater is used, or other application The fluid is fed to the two tubes system by a surface pump with the power to offset hydraulic head losses and to maintain the necessary pressure when it ascend to surface in such a way that fluid is kept liquid for most of those of possible use. In its way downward the fluid absorbs the thermal energy transferred by rocks whose temperature increases with depth. The deeper the fluid goes the more energy it absorbs. At certain depth the fluid is hot enough to be used as a thermal power source or to desalinize it in an integrated process that would also produce electric power, if seawater is used.

At a certain depth that depends on the local thermal gradient, the hot fluid enters the internal tube through the slots. The hot fluid is forced upward by the pump or by a change of state plus the pump action. A valve at the end of upward fluid way is used to maintain it at the specified pressure.

Given that the internal tube is insulated by a fiber filling the space between the two walls, heat loses are low. The heat lost from the ascending fluid is gained by the descending one. There are minor total heat loses in the system. At surface the hot fluid passes to an insulated pipe that takes it to be applied for power generation or for desalination plus power generation, or other application The internal tube is formed by two walls joined by four veins that make it a one piece from the stiffness and most stress states point of view. The final internal tube is assembled by screwing many segments with a length of approximately twenty meters each. The whole internal tube weight depends on its diameter, length and wall thickness. Depending on its diameter a six thousand five hundred meters length tube may be as heavy as one thousand tons or more.

Depending on the project characteristics and economics high strength stainless steel, high strength steel, aluminum, carbon fiber or other appropriate material may be used for the internal tube construction.

The inner pipe as when assembled become extremely heavy. Longitudinal stresses are a limit to the internal tube length if it is going to be hung from surface for joining segments during construction or it own weight could lead to collapse during operation. This difficulty can be overcome by means of a special braking and positioning subsystem that exerts a horizontal force by electro hydraulically operated parts with radial displacement that is electrically operated from surface. A non abrasive special band with high friction coefficient exerts the necessary force against the casing for the in situ construction job. This horizontal force develops a vertical friction force that allows the pipe to be hung from each one of the braking and positioning subsystems spaced a vertical distance similar to two hundred meters.

Fluids flowing downward by the space between tubes and upward by the internal tube may induce vibrations that if not controlled can destroy the system. To reduce the possible horizontal vibration amplitude the internal's tube external wall has groups of four welded separators with vertical spacing between them that may be similar to four meters. Separation of the four welded separators group depends on the stiffness of the internal tube. Separators are located off a longitudinal line; in the plane form angles of 90° between each other.

There is a small distance from the separators free extreme to the casing allowing the insertion of the internal into the outer tube. When the internal tube intends to vibrate the horizontal displacement pushes some separators against the casing and the amplitude becomes self controlled. This is a unique and very important dynamical characteristic of the internal tube. Vertical vibrations are not of main concern due to their high frequency and low amplitude.

Temperature changes of the internal tube are not detrimental due to the hanging point support supplied by the braking and positioning subsystem. The horizontal force developed forms only a partial restriction to the longitudinal deformations produced by temperature changes.

As thermal energy is being transferred to descending fluid from rock, the rock develops a cooling process that has to be reduced to finally obtain an acceptable long term state. Due to the rock's low thermal conductivity distant thermal energy cannot replace quickly the transferred one. Auxiliary directional drillings and the main drilling itself are used to inject high pressure water to micro fracture a surrounding volume to the main well. During normal operation water is injected through the secondary wells forming a kind of sinuous flow network that stimulates the convection of distant thermal energy in the direction of the main well improving the replenishment of the surrounding rock thermal energy.

The following detailed description of the invention starts with the figures and the main components. To complement the possible applications of the invention there is a mention of some main external components for power generation or seawater desalinization. Part of the invention description is dedicated to in situ construction because the braking and positioning subsystem is an integral part of the internal tube.

Description of the Invention's Major Components Shown in FIGS. 1 to 4

Figure 1B:
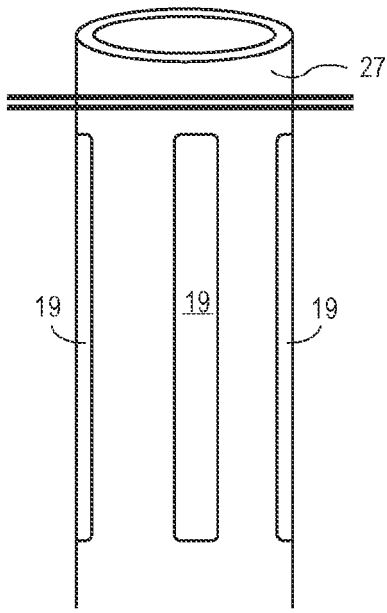

Looking for generality the basic scheme shown in FIG. 1 is located on a shallow sea where a desalination project with integral power generation can be developed. The basic unit may be built either on shallow sea or inland. It all depends on the project's object.

The main components of the invention are numbered from 3 to 53.

Figure 6:
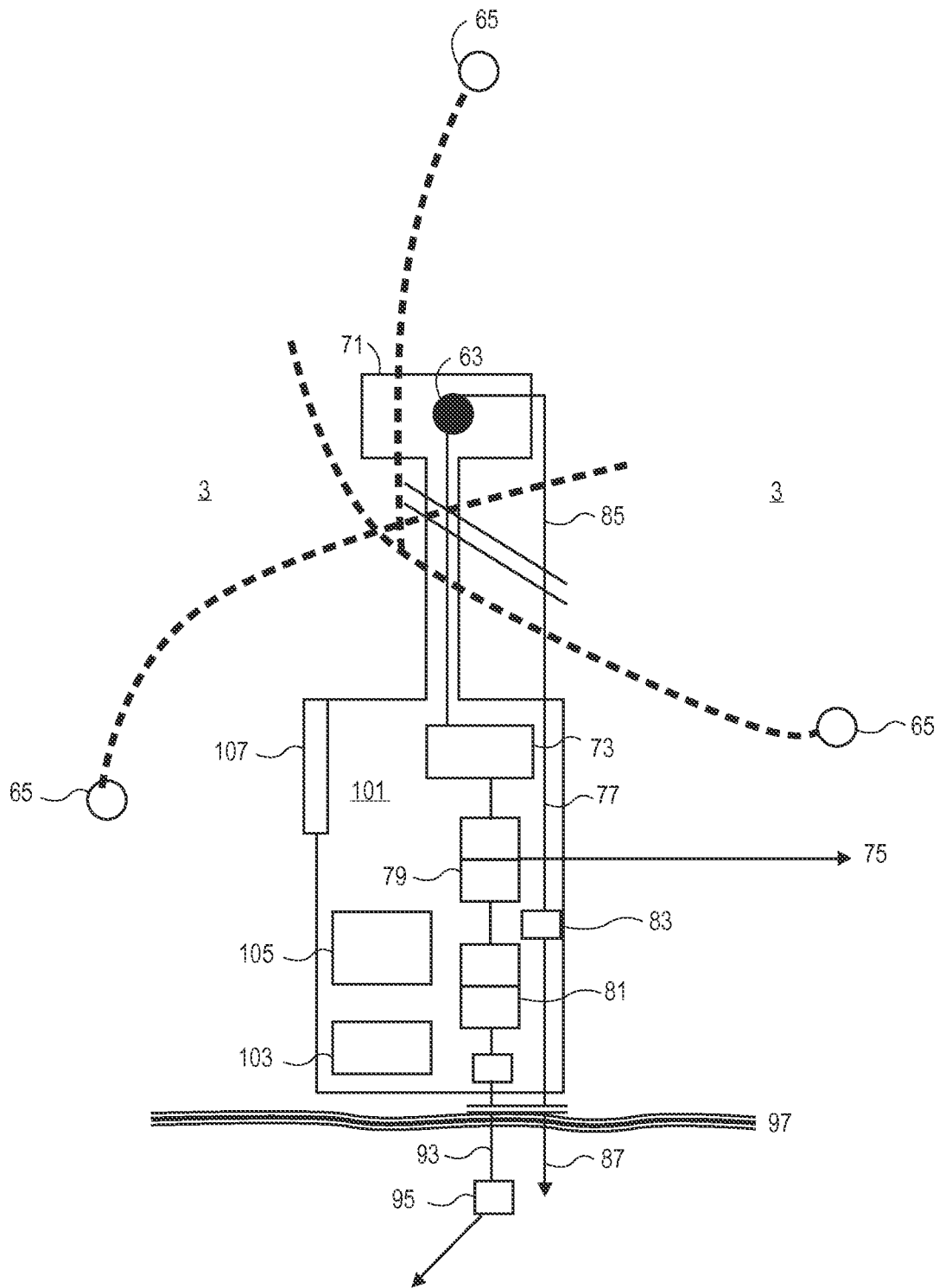
FIG. 6: Basic plan scheme of the system's application to seawater desalination showing the secondary directional wells to develop a thermal convection process from more or less distant regions to the main well. Drawing is not to scale.
Figure 7:
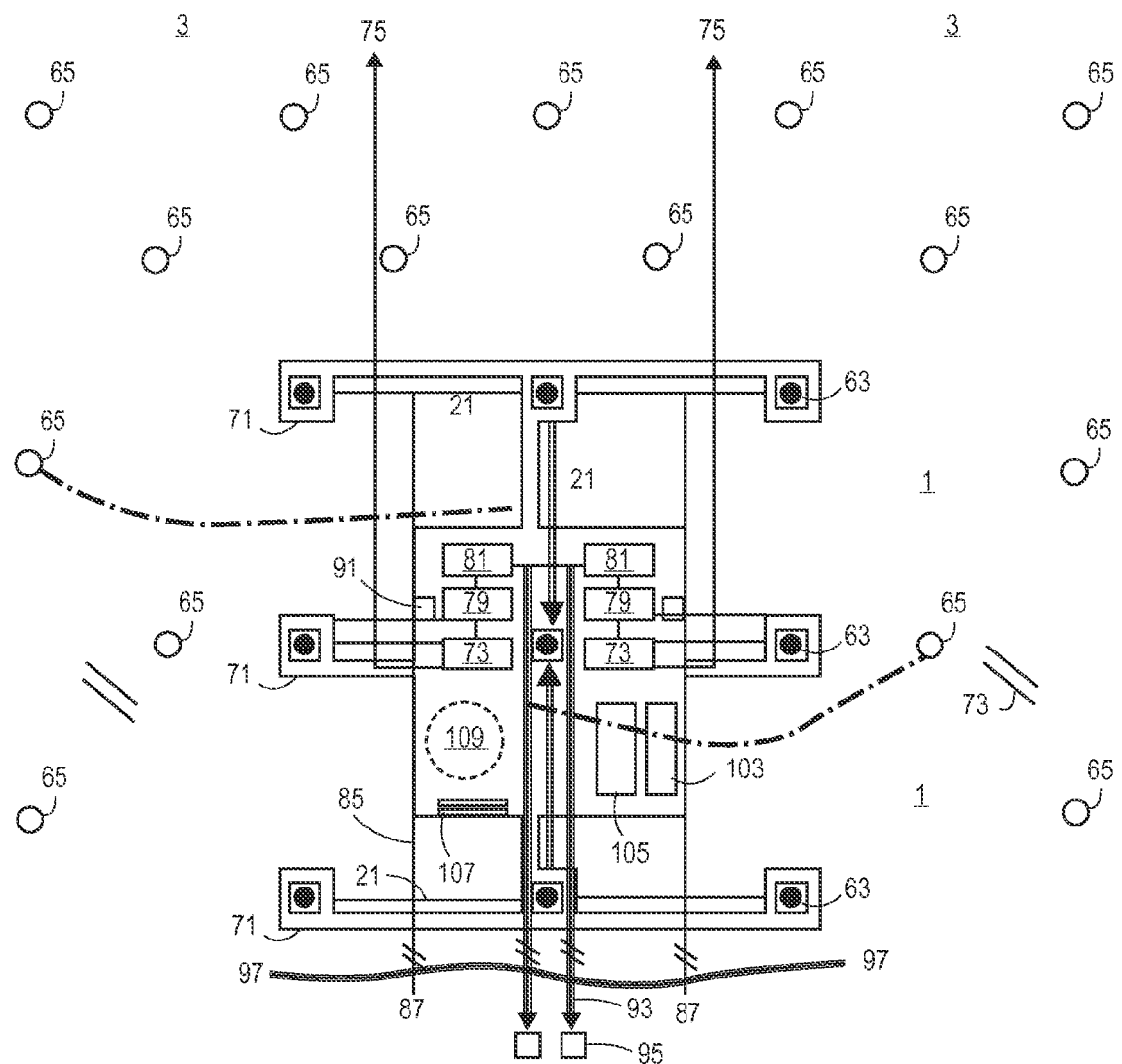
FIG. 7: Basic plan scheme of the clustering of nine basic systems including external appendages for seawater desalination and power generation as a possible application. Secondary wells and the tube to throw the salts are shown. Drawing is not to scale.

3 A shallow sea: if the project is to be constructed for seawater desalination, an example is shown in FIGS. 1, 6 and 7. The procedure would be built on a shallow sea to whose temperature may vary possibly from 5° C. to 25° C.

5 Seabed, shown in FIG. 1, is an example where the objective is to desalinized seawater. The shallow sea depth could be about 5 meters. Local conditions may vary due to sea wave height and tides. It is likely that the temperature of the seabed and the water are about the same. The project can be built inland for purposes different to seawater desalination; in this case 5 means natural ground level.

7 Screen, shown in the FIG. 1, is used to retain rubbish and thick sediment if built on shallow sea, where the objective is related to seawater desalination. If the basic system is built inland a screen is also required.

9 Seawater adduction, shown in FIG. 1. This part exists if the project's objective is seawater desalination. If the project is built inland, and/or is a closed system it is also necessary to have some kind of adduction.

11 Main pump, shown in FIG. 1, is a pump whose power depends on the depth of the well. It serves to boost the fluid and maintain a stable flow that enters the process and descends toward the Earth's interior to emerge at the surface through an interior tube. A pump is required for any of the possible project purposes.

13 Addition of products to the fluid, shown in FIG. 1. Some products may be added to water arriving to be heated. Some products delay the formation of salt scales in the tubes.

15 Downward fluid flow is shown in FIG. 1. Forced fluid shown with arrows is fed by the pump and changes direction, descending to the bottom of the well flowing through the space between the tube casing and the internal tube. Downward flowing space is maximum at the top of the well and minimum at the bottom. Fluid flow speed increases with depth and depends on the diameters of the two concentric tubes. Turbulent flow is expected along most part of the fluid way; this is very important from the point of view of thermal transfer to the fluid.

17 Upward flow of heated fluid through an internal tube, shown in FIG. 1; fluid direction is shown with arrows. The lower part of the internal tube has enough slots to allow the hot fluid passing in. If the fluid is water it has to be pressurized to keep it in the liquid state. Other fluids, for example methylene chloride or isobutane may flow upward as a gas

19 Slots for hot fluid pass to the internal tube, shown in FIG. 1. Several internal tube segments of the well's lower part have slots. This allows hot fluid to pass in to the internal tube to flow to surface. As shown in detail 200 of FIG. 1 there are four slots in each horizontal plane. Slots shapes are rectangular with the long side along the tubes axis. The slot's perimeter has welded plates to the tube walls to avoid the fluid to pass to the space between them. The slots borders must be rounded to improve flow conditions.

20 Valve to control the ascending fluid pressure, shown in FIG. 1. The operating position of this valve controls the ascending fluid pressure when combined with the operating pressure in the main pump 11.

21 Steam pipe, shown in FIG. 1 is thermally isolated to feed the hot fluid to an application such as power generation or the integral possibility of seawater desalination with power generation.

23 Well closure cap, shown in FIG. 1, is a steel component that firmly closes the well changing intake horizontal fluid direction to downward vertical.

25 Drilling casing, shown in FIGS. 1, 2, 3, 4 and 5. Depending on the type of project it is a stainless steel casing or special steel one installed as used in the oil extraction industry. The casing forms the external tube of the system. Case diameter is maximum at surface and minimum at the deeper part of the drilling. In some of its parts the casing thickness may be about one centimeter. A 6,500 to 7,500 meter deep well may have up to five casing diameters similar or larger than 0.64 meters, 0.72 meters, 0.80 meters, 0.88 meters and 0.96 meters, respectively from bottom to top. New drilling procedures may reduce the number of case strings.

27 Internal tube, shown in FIGS. 1, 2, 3 and 5, is a double-wall stainless steel pipe or made of a material resistant to the pumped fluid action. It is formed by screwing successive segments of pipe together. Each segment length may be about 20 meters. Each internal tube stretch has two walls with the thickness appropriate to resist mechanical stresses. Wall thickness may be about one centimeter. Walls are joined by internal veins 28. From the mechanical point of view the tube behaves as a single unit. The more or less two centimeter space between the walls is filled with fiberglass or other light, low thermal-conductivity material. External and internal diameters are constant but may be different for each project according to its characteristics. The internal diameter is fixed, and flow has no obstacles.

Figure 2A:
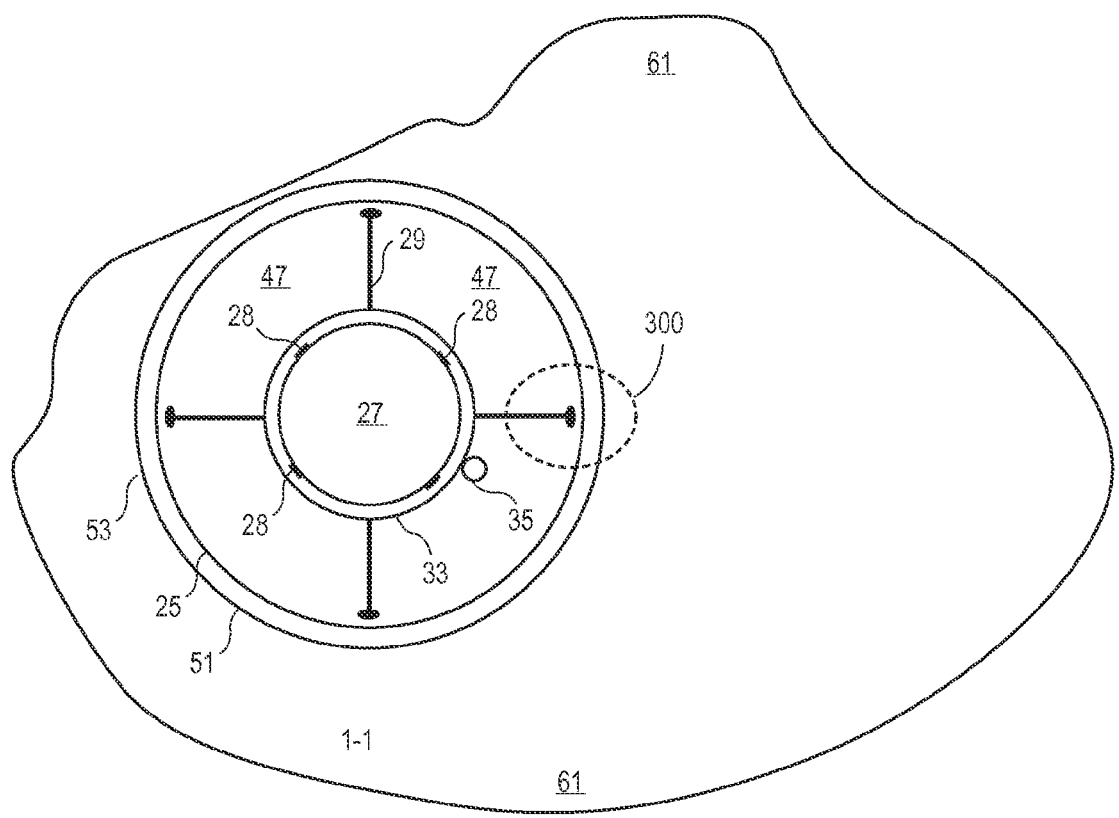
FIG. 2A: Section 1-1 shown in FIG. 1, and FIG. 2B detail 300. This figure shows a cross section of the concentric tube system's separators and the veins than join the two walls of the internal tube. The detail 300 illustrates the space from separators to the external tube formed by the well's casing. Drawing is not to scale.
Figure 2B:
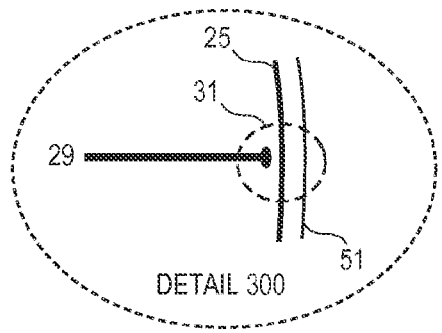

28 Internal steel veins to join internal tube walls are shown in FIG. 2. At least four veins joint the walls of the internal tube. The pipe acts as unit to resist the stresses. The width of the veins should be about 4 centimeters.

Figure 4A:
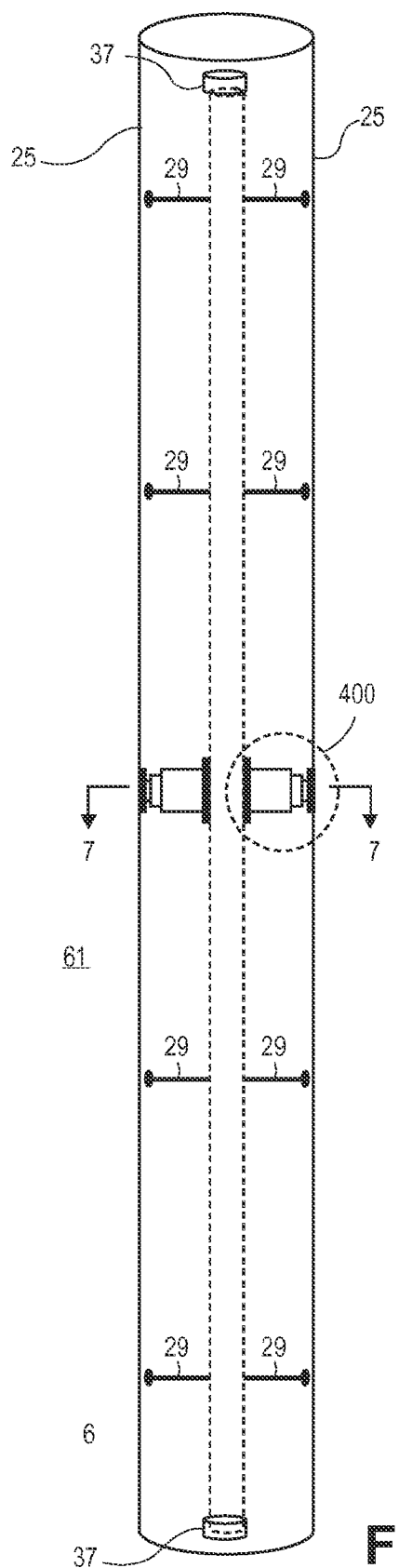
FIG. 4A: Scheme of the braking and positioning electro hydraulic subsystems and detail 400, FIG. 4B plan view, FIG.4C vertical section. Drawing is not to scale. This figure shows the composition of the braking and positioning electro hydraulic subsystem that allows the installation and fixation of the internal tube final position. The figure shows a scheme of the electro hydraulic power unit that produces horizontal forces between the two tubes. Those horizontal forces develop vertical components when the internal tube tends to slide. Detail 400 shows the moving parts of the braking and positioning subsystem. Drawing is not to scale.
Figure 4B:
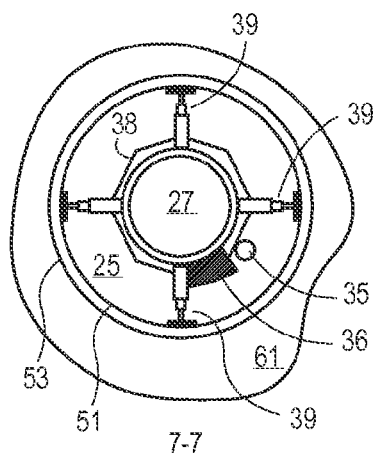
Figure 4C:
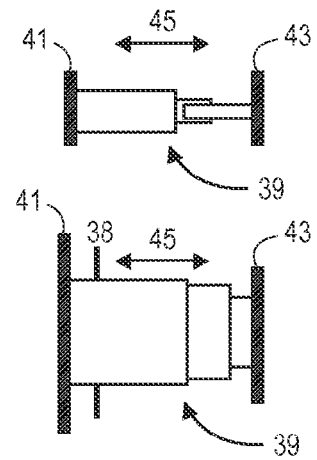

29 Internal tube separators are shown in the FIGS. 3 and 4. The separators are in situ welded bars to the internal tube's external wall. The separators have a small plate at the tip to improve the eventual contact against the casing and are aligned along the tube length. Separators are welded in planes normal to the tube axis; planes are spaced about four meters, but spacing depends on the two tube's diameter involved. From the structural dynamics point of view the separators may be considered as stiffeners because they give many supports to the internal tube once it begins to produce horizontal vibrations. For the same tube, stiffness depends on the span between supports.

As the diameter of the well changes in strings with depth, and as the diameter of the internal tube is constant, the separator's length changes with depth and must be the exact one for each casing string as shown in detail 300 of FIG. 2. Separator tips are made by an enlargement of the bar.

The separators control the horizontal vibration amplitude that could occur due to flow turbulence. The separators tips extend to a very close distance to the casing to allow the insertion of the internal into the external tube. As the internal tube tends to develop horizontal vibrations, the separators touch the casing assuring self control of the vibration amplitude. Those unique components are very important for the stability of the system.

31 Space between separators and casing, shown in detail 300 of FIG. 2. The distance from separators to the casing shows the internal tube installation could be from 1.5-2.0 centimeters, but in any case depends on the diameter of both tubes.

33 Internal tube insulation, shown in FIG. 2, consists of a very low thermal conductivity glass fiber that fills the space between the internal tube walls. It is aimed to reduce the heat loss from the ascending fluid into the one descending.

Figure 5:
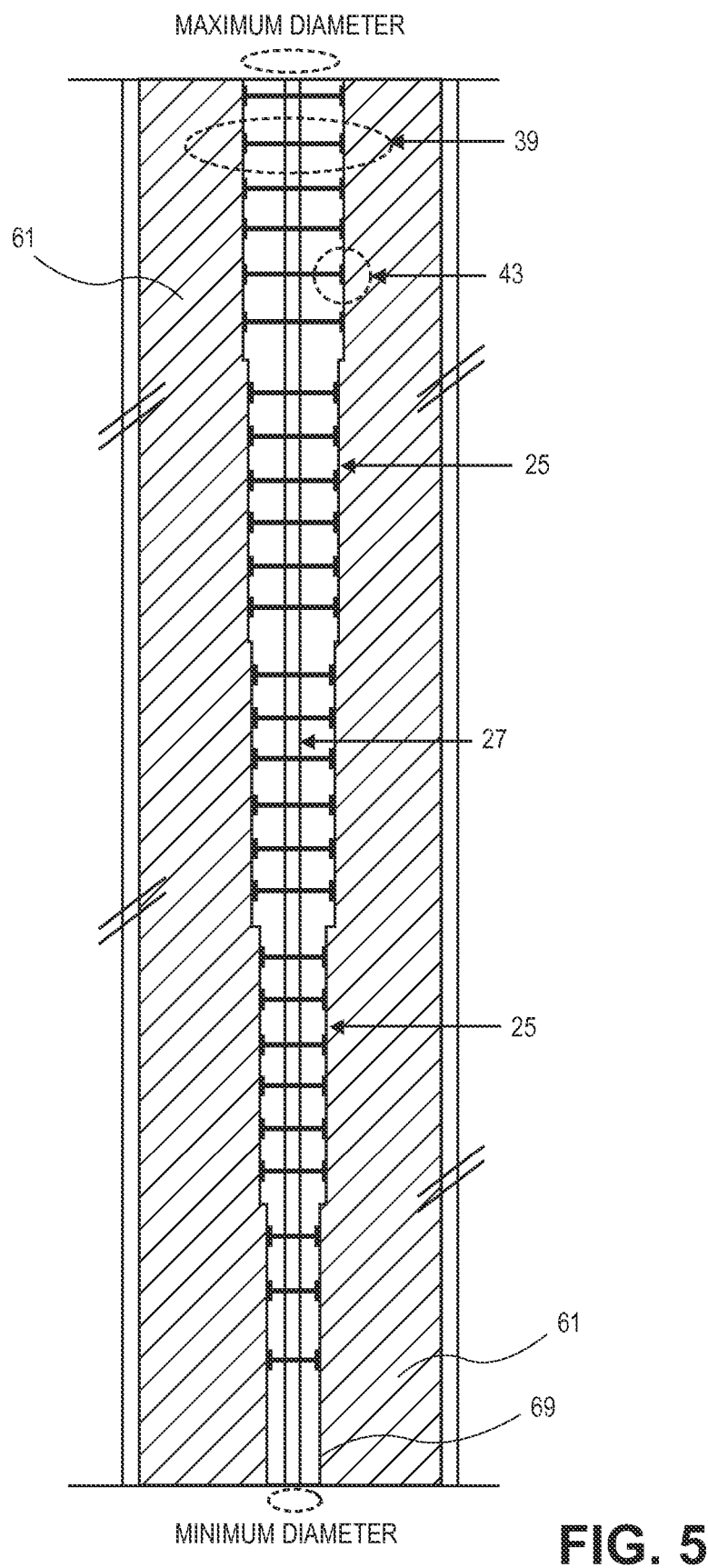
FIG. 5: Approximate vertical distribution of the electro hydraulic breaking and positioning subsystem that allows the in situ ensemble and construction of the internal tube. The sub system is electrically operated sending signals from surface through the cables. There is a cable for power supply.

35 Pipe for the shielded electric line and control signals for the braking and positioning control subsystem, are shown in FIGS. 4 and 5. The pipe extends up to surface. It is a small special steel pipe to protect the electric cable and the cable with the control channels that allow the simultaneous operation of all the braking and positioning subsystem from the surface.

36 Electro hydraulic component that supplies the pressurized fluid to produce the radial displacement of the braking and positioning subsystem 39 is shown in FIG. 4. This is a sealed component to be carefully installed in situ. The component has a small electric motor that powers a small pump. As ordered from surface, both parts combined are able to increase or decrease the fluid pressure that produces the braking horizontal force. The components are welded to the internal tube wall The electric line allows the more or less thirty braking and positioning subsystems necessary for a basic system to be simultaneously operated from surface developing the same pressure to obtain the same horizontal force in all of them. This is a very important characteristic of the invention. Simultaneously the subsystems group obeys the same signal sent from surface. Pressure is the same because horizontal forces support equal weights.

37 Screw to join double wall internal tubes, shown in FIGS. 3 and 4.

38 Small fluid pipe connecting the electro hydraulic component with the moving parts of 39, shown in FIG. 4.

39 Internal tube positioning and braking system, shown in FIGS. 3 and 4, is for temporary and permanent internal tube support. This is a sealed component to be installed in situ whilst the corresponding segment is at surface. It is formed by a horizontally expandable brake system from internal tube wall to the casing actuated by the electro hydraulic 36. At its maximum length, a special material band in the plate 43 presses the casing. The vertical force developed by friction when the tube tries to slide may safely support the weight of 200 meters or longer segments of the internal tube.

There are three components, two of which have a horizontal telescopic motion; the internal one is welded to plate 41. The three elements are encased one inside the other, and the pressure fluid pushes them to move horizontally. The three elements height and width approximate dimensions are: 12×10 centimeters, 10×8 centimeters and 8×6 centimeters. As said, the 8×6 centimeters free extreme has adhered to its surface a high friction softly abrasive band 43 that exerts pressure against the casing.

41 Bearing plate welded to the internal pipe wall, shown in FIG. 4, is a plate to distribute the horizontal force exerted against the internal tube wall.

43 Brake plate and band strongly adhered to its surface, shown in FIG. 3, is similar to a car brake band. The band must be constructed with a non-abrasive high-friction coefficient material.

45 Direction of radial telescopic movement of the brake and positioning system is shown in FIG. 4.

47 Space between external and internal tubes is shown in FIG. 2. Through this space the liquid flows downward receiving the heat transferred from the surrounding rock. The flow space is a maximum at the upper part of the well and a minimum at its lower part. Separators 29 are minor obstacles to the downward fluid flow during steady state operation. Flow velocity is higher at the bottom than at the upper part of the well.

51 Rock border in the well, shown in FIGS. 2, 3 and 4.

53 Filling mortar is shown in FIGS. 2, 3 and 4. Filling mortar fixes the external tube against the rock. To fill the space between the drilled rock border 51 and the casing 25 it is necessary to use a very high thermal conductivity mortar in order to improve the thermal energy transfer from the surrounding rock to the downward seawater flow. Space to be filled between casing and rock may be about three centimeters. Once cement mortar is in place the casing is connected to the rock with the mortar's own thermal conductivity.

Figure 8:
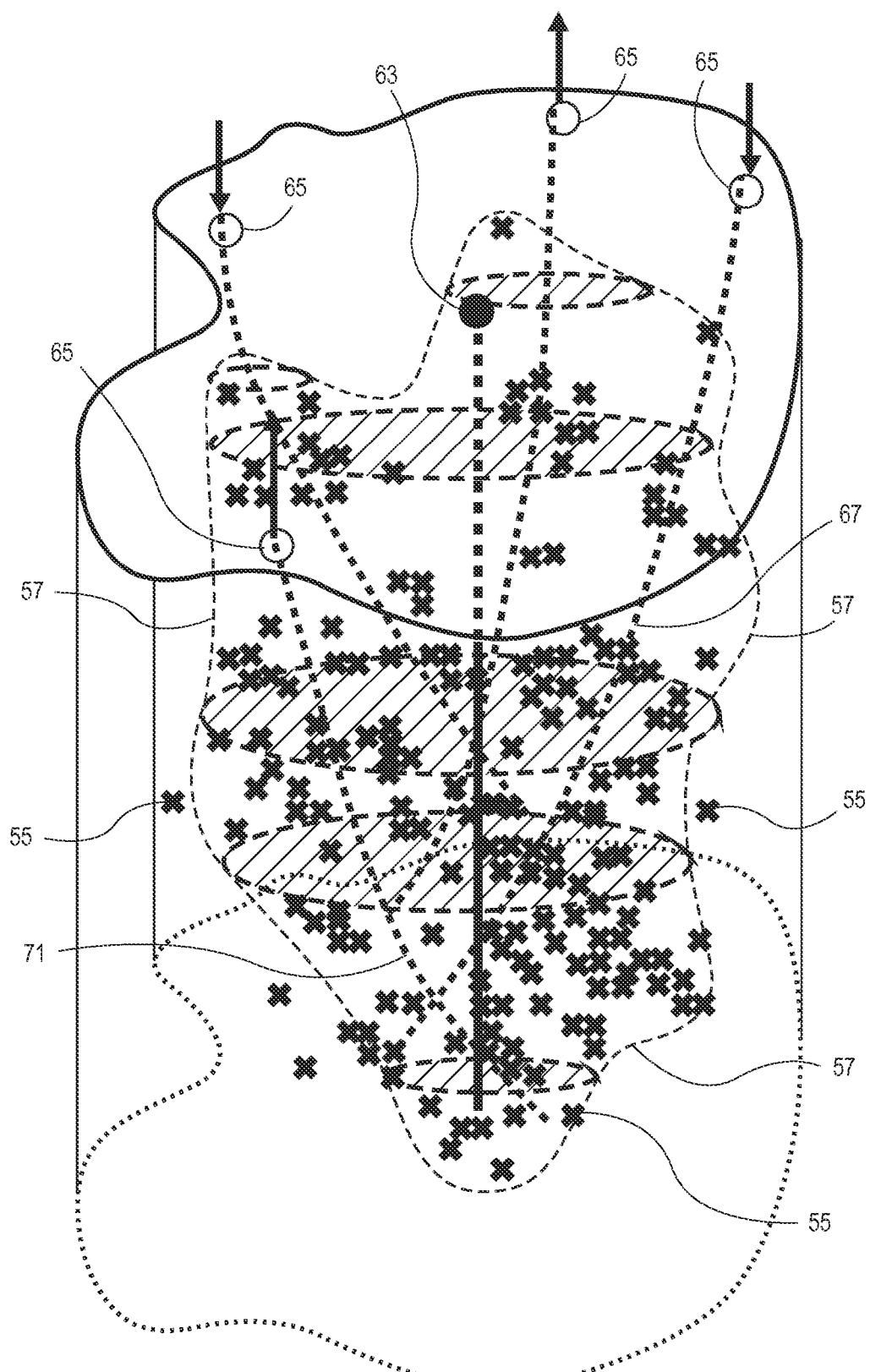
FIG. 8: Micro fractures produced by high pressure water injection and secondary directional drillings to inject water to stimulate heat convection during normal operation. Drawing is not to scale.
Figure 9:
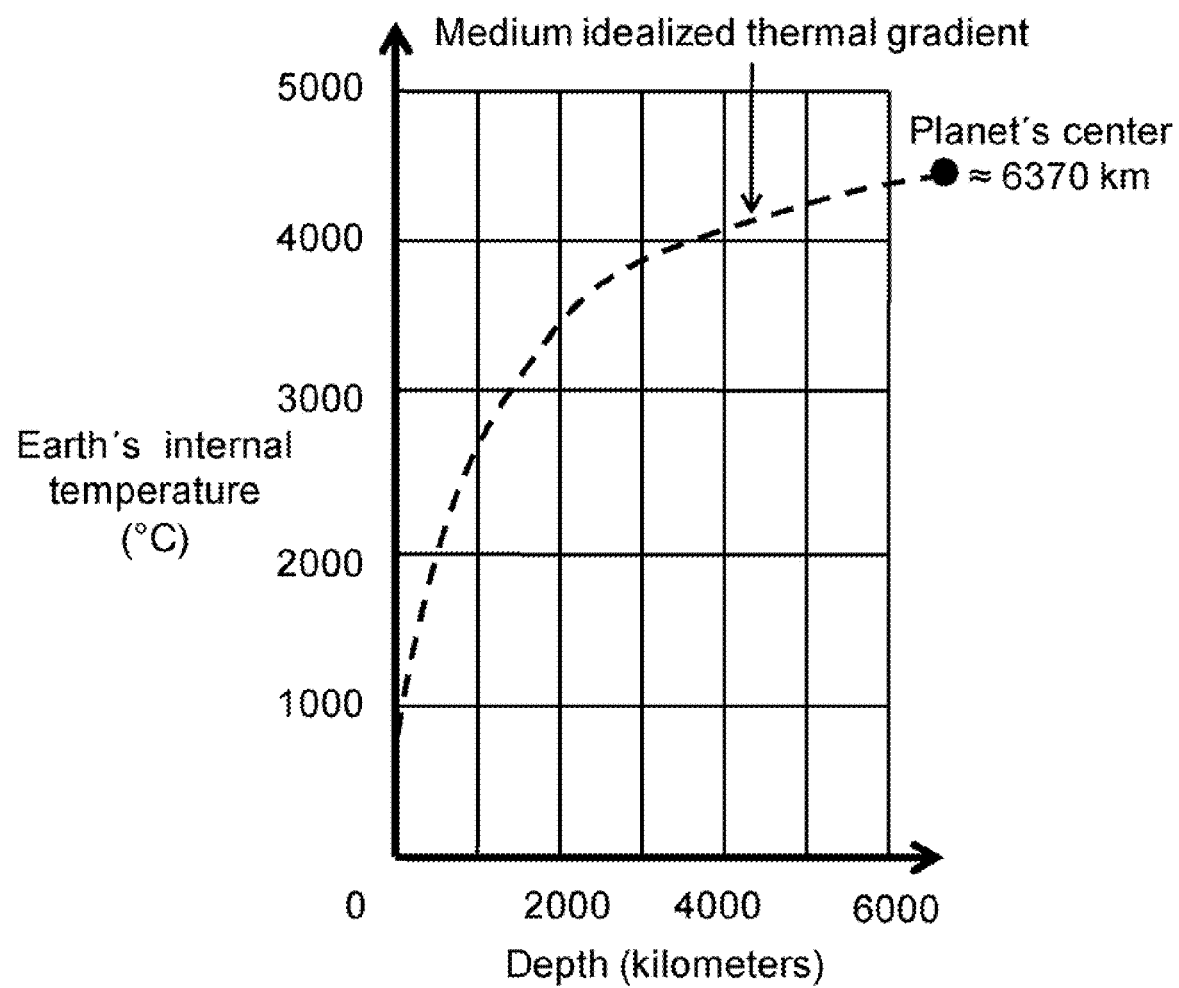
FIG. 9: Idealization of the earth's vertical thermal gradient.
Figure 10:
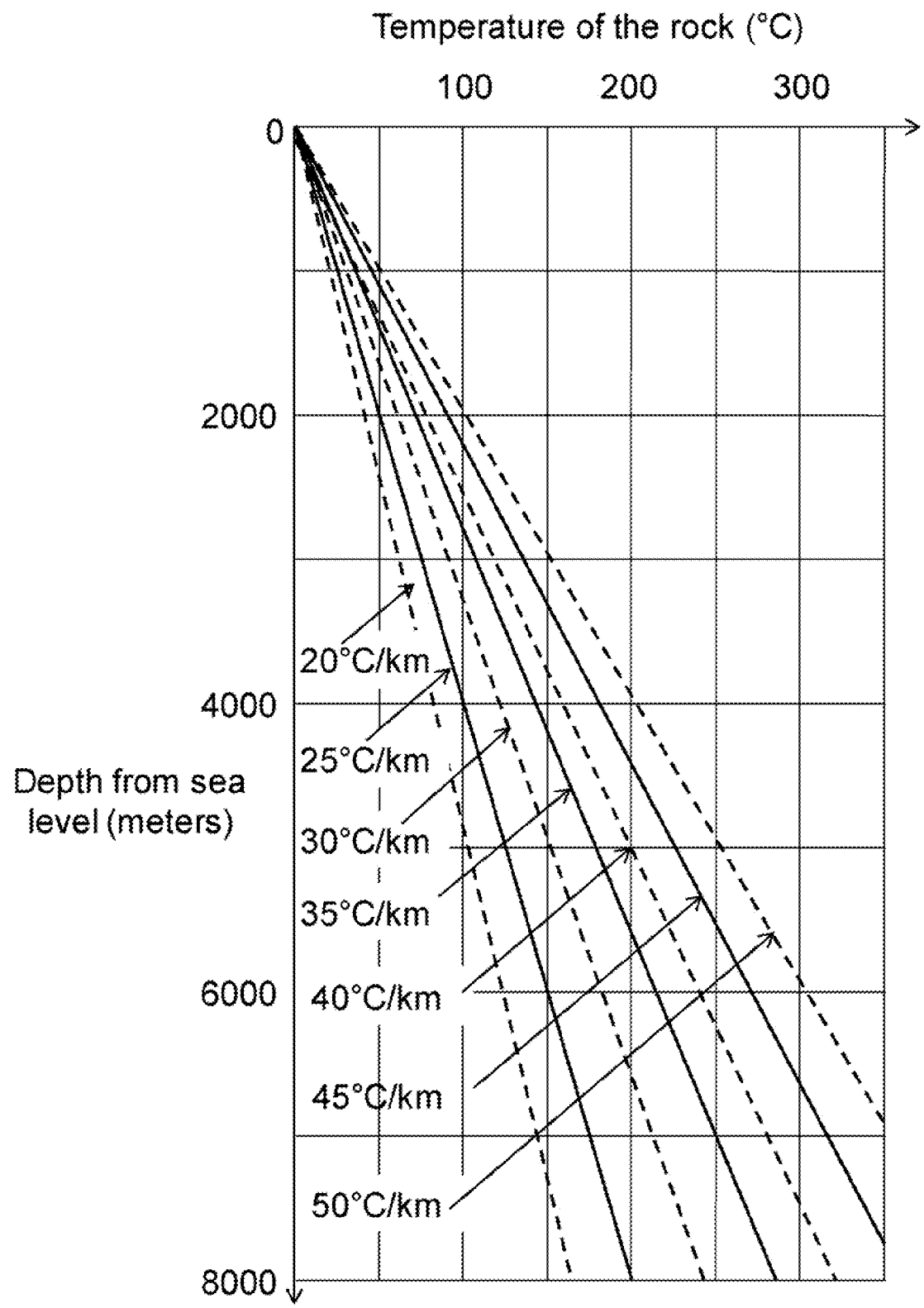
FIG. 10: Idealization of several thermal gradients in the earth's continental upper crust.
Figure 11:
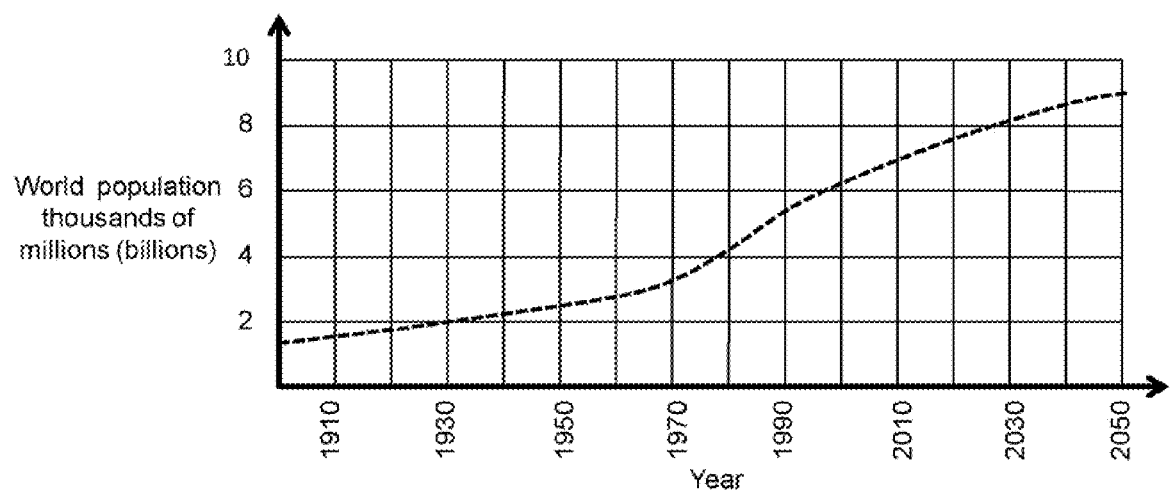
FIG. 11: World population, years 1900 to 2050.

Additional Components Shown in FIGS. 6, 7 and 8

What follows is related to external components of the invention, such as work necessary to built the wells. Those main additional components are numbered from 55 to 69.

55 Micro fractures in the rock by pressure water injection are shown in FIG. 8. To improve the thermal behavior of the main well, the rock is micro fractured by high pressure water injected through secondary directional wells. Those micro fractures are more or less equivalent to increasing the rock porosity. A much lower pressure injection is necessary during system operation, to develop a water flow that transfers thermal energy by convection. The directionality of the secondary wells stimulates convection toward the main well.

57 Micro fractured volume limits are shown in FIG. 8. The volume is an idealization of the micro fractured domain extension. This volume is part of a bigger one where a sinuous flow net develops that allows the injected water during the economic life of the system to transfer heat by the convection mechanism. Part of this transfer is directed to the system's well position surrounding rock.

61 Rock surrounding the wells is shown in FIGS. 1, 2, 3, 4 and 5. The rock's temperature increases with depth. Mass, specific heat and thermal conductivity of the surrounding rock varies with mineral composition, depth and with geographic location.

63 Main drilling is shown in FIGS. 6, 7 and 8. The two tubes of the system are inside the main well, which is a vertical deep well with variable diameter. The well is drilled according to procedures used in the hydrocarbon extraction industry.

The well has a maximum diameter at the surface and a minimum at the bottom. At the surface the drilled diameter could be similar to one meter and at bottom it may be similar to 0.70 meters. Diameters depend on the design flow. This drilling will also be used for high water pressure injection to cooperate in rock micro fracturing.

The drilling depth depends on local conditions but most times it is expected to be minimum 6500 meters. Local conditions are dependent on the earth's interior regional thermal regime. Depth must be that necessary to allow the fluid to heat up to the necessary temperature for the project's application, e.g. about 150° C.

65 Secondary inclined directional drilling is shown in FIGS. 6, 7 and 8. These external drillings, directed to the main one, are required for water pressure injection for rock micro fracturing, and for keeping permanent low pressure water circulating through the rock during the system's economic life. The secondary drilling upper part is separated some distance from the main well; distance depends on local conditions.

Water injected during system operation becomes an important heat transfer mechanism because it flows through a net that may evolve with time. Water injection is done through one or more secondary wells. As injected water flows and heats, part of the thermal energy it gains is transported to the main drill neighborhoods retarding rock cooling.

67 Idealized trajectory of directional drilling, shown in FIGS. 6, 7 and 8.

69 Bottom of the well, shown in FIG. 5.

Other Main Components for Seawater Desalination and Power Generation as an Example of System's Application Other main components related to the invention are required for applications, like seawater desalination and power generation. Those components are not a part of the invention. The components are shown in FIGS. 6 and 7 and are numbered from 71 to 109.

71 A submerged concrete structure for water adduction is shown in FIGS. 1, 6 and 7. It is a sealed concrete structure for the main pump with its mechanical screen of retention of wastes and fine sediment. This structure would provide support to a crane required for the internal tube installation.

73 Flash tank separator where fluid is converted to vapor releasing salts if sweater is used, shown in FIGS. 6 and 7.

75 Salts and sediments extraction if fluid used is seawater or sediments if fresh water is used is shown in FIGS. 6 and 7.

77 Insulated pipes for steam flow are shown in FIGS. 6 and 7.

79 Turbine and generator, shown in FIGS. 6 and 7, are powered by the steam obtained from heated fluid in the Earth's interior.

81 Decompression and fluid cooling is shown in FIGS. 6 and 7.

83 Electric substation is shown in FIGS. 6 and 7.

85 Electric lines are shown in FIGS. 6 and 7.

87 External grid, shown in FIGS. 6 and 7.

93 Desalinized water pipe, shown in FIGS. 6 and 7, takes the desalinized water from the pump to the elevated tank.

95 Elevated water tank, shown in FIGS. 6 and 7.

97 Coast line shown in FIGS. 6 and 7.

101 Main construction, shown in FIGS. 6 and 7. A fairly large construction is necessary to receive the components necessary to build a basic desalination and power generation using the Earth's internal thermal energy or for a conventional geothermal power generation. Large components such as turbine, generator, decompression chamber, substation, main pumps, dorm, office and warehouse are some of the many parts required for applications of a basic heating fluid unit.

103 Warehouse and maintenance activities, shown in FIGS. 6 and 7.

105 Offices and dorm, shown in FIGS. 6 and 7.

107 Pier, shown in FIGS. 6 and 7.

109 Heliport, shown in FIG. 7.

Assembly and Installation of the Internal Tube

Only a few segments of tube 27 have the slots 19. Depending on the well's depth some thirty or more of the tube 27 segments have braking and positioning subsystem elements 36 and 39. Most of the tube 27 segments do not have slots or braking and positioning subsystem elements; those without the 19 and 39 parts are the regular segments. All segments of tube 27 have the separators 29 welded in the job site.

To start the assembly it is necessary to hoist a complete segment of the internal tube 27, more or less twenty meters long, with separators 29 and slots 19. The piece of tube is descended vertically inside the 25 external one. The vertical segment is kept firmly at ground level. Another complete stretch with separators and slots is hoisted to a vertical position and screwed to the first one. The two stretches are lowered the length of a new stretch. The operation is repeated until the specified number of segments with slots are screwed and hanging. Then the new segments added are regular ones, not perforated. About every two hundred meters the breaking and positioning subsystem 39 and its components are joined, at surface level, to the inner tube.

When the length of the hanging column of the 27 tube screwed segments is about two hundred meters the first stretch with braking and positioning sub system 36 and 39 is hoisted by the crane and screwed to the hanging column. It is installed with its pipe and cables 35 its local pipe for electro hydraulic operation 38. The pipe 35 is fixed with collars to tube 27.

The four closed components 39 and the component 36 with its electric motor and the fluid pressure connection 38 is factory assembled and is ready to operate once it receives the order from the surface. Once it is ordered to exert the horizontal supporting force the column below is hung from the four 39 components. As said, there may be thirty or more braking and positioning subsystems in a complete whole internal tube.

When the column of tube 27 has the maximum specified weight it begins to be hanging from the braking and positioning subsystems 39. To do that, from the surface the motor is ordered to compress the fluid to a known pressure assuring that the horizontal force of 43 against external tube 25 can develop the required vertical friction force if tube 27 tends to slide. To allow a descent of the tube 27 all braking and positioning subsystems receive the instruction to decrease a bit the internal pressure. The plate and band 43 softly slide the length that local site conditions require. If pressure in 36 is increased the tube 27 stops its lowering.

A careful increasing and decreasing pressure in 36 allows the whole tube 27 to be installed and kept in place because the pipe slides and stops its descent according to detailed previous planning. The final pressure in 36 is permanent along the economic life of the system to heat fluid with the internal thermal energy of the earth.

Permanency of the pressure in 36 is necessary to avoid the whole tube 27 tendency to be supported in its lower part on the bottom well 69. If this happens there may occur elastic instability, buckling phenomena, along parts of the tube mainly in its lower half, and compressive stress would be higher than that allowed by the steel. Buckling and compression failures of tube 27 are avoid by the system's supports.

The procedure has a routine where about ten non-perforated segments of the tube 27 are assembled for one with the braking and positioning subsystem 36, 38 and 39. It means that each of the braking and positioning subsystem may safely sustain lengths not very much longer than two hundred meters through the pressure force exerted against the casing 25. The final distribution of the braking and positioning subsystem will depend on local conditions and variations are expected.

The General Static and Dynamic Behavior of the Internal Pipe

Good static behavior of the internal tube is assured by the type of lateral supports and by the stiffness and strength of the two walls joined by four veins. Those conditions assure that stresses are within allowable limits.

The general assemblage procedure described produces an internal tube that is supported at its bottom and upper extremes and in many intermediate horizontal forces exerted between the two tubes by the braking and positioning subsystem and by the separators. The whole internal tube lays immersed in the fluid that fills the space between the two tubes.

The large number of separators, the intrinsic stiffness and strength of the internal tube, the horizontal supports of the breaking and positioning subsystems, the presence of some small vertical deviations of the well and the damping action produced by the fluid in space 47 are the ways to obtain a good dynamical behavior when vibrations tend to develop. Horizontal vibrations could destroy the system. The invention's characteristics are aimed to avoid the occurrence of modes of vibration that could be dangerous for the system.

As the separator positions in each plane have a phase angle, the support distance that really occurs when the internal tube tries to develop horizontal vibrations is smaller than about four meters which separate the planes where separators exist.

The large quantity of supports against tube 25 and their distribution along the whole length of tube 27 conform a way to assure good dynamical behavior of the system. This is a very important and unique characteristic of the invention.

The Possible Main Applications of the Invention

The possible applications of the invention are related to power generation, and to seawater desalination in an integral process with power generation. The concentric-tube system could be applied also for classical geothermal power generation. FIGS. 6 and 7 are related to a scheme of a basic system applied to seawater desalination and power generation, and to a cluster of nine basic systems for the same purpose.

It is possible to obtain base power not dependant on weather conditions, such as sunny or windy days. The generated power and desalinized water obtained, if that is the purpose of the system's application, use only the thermal energy of the earth's interior. Those are clean processes from the environmental point of view. As the power can be obtained in most parts of the continental or island planet's surface or along its coasts, the generation may be located close to the consumption centers reducing the important investment in electric transmission lines.

Turbo generators and different main and minor components are required. After the power generation the remaining fluid is re-injected into the well forming a closed circuit with minor fluid loss. Basic systems can be clustered.

If seawater is used as circuit fluid the pump and valves can put enough pressure to keep it liquid while flowing upward. In that case salts may be extracted at surface in a decompression chamber where the expansion yields vapor and salts are released to be extracted in a similar way to the one used in the vaporization procedure for desalinize the seawater. Once condensed the taste of the potable water obtained is improved by adding some products also used in the traditional desalination processes. It may happen that not all of the fluid can be converted to vapor when decompressed. In this case, if the end application is water desalination, some fluid has to be reheated to be vaporized or passed through membranes. Multi-stage flash or reverse osmosis methods can be used for this part of the power generated by the double tube apparatus.

Advantages of the Invention

My invention is aimed to be employed as the source of hot fluids for power generation. It is also aimed to heat seawater that can be desalinated in an integral process with power generation. The invention can also be advantageously used in traditional geothermal power generation. Fresh water, sea water, brackish water or other fluids may be used to be heated in a concentric tube system in a deep well that receives hot rock thermal energy. My invention can also be employed to heat large constructed areas.

Sea water desalination and power generation as described above have economic benefits due to the production of potable water and surplus electric power. There are also the following advantages with respect to other methods in commercial use:

a) The system is essentially clean from an environmental point of view, and its contribution to global warming is negligible because it does not require an external supply of electric power. It has a relatively small foot print that is also convenient from the environment point of view.

b) With adequate drilling depth my system can be installed along most coastal regions of the world and does not depend on sunny or windy days. Therefore it has weatherproof power generation capability with desalinated surplus water. It may be located close to consuming centers reducing the energy transmission costs.

c) My system may be employed for a permanent and economic water supply in zones relatively close to the coasts where there is not enough electric power to operate desalination by osmosis or by evaporation. If necessary and with extra cost, the potable water can be taken much further inland.

d) The system uses energy existing in the earth's interior. That thermal energy is inexhaustible from a practical point of view. Its origin corresponds to the way the earth was formed and is maintained by very long half life radioactive materials including thorium and uranium.

e) The system can be developed in clusters to reduce the overall cost and reduce the unit cost of potable water and energy produced.

f) Clusters of basic systems of my new procedure can be employed to produce potable water for large cities or for agricultural projects that would contribute to the reduction of endemic famines. In some regions of the world affected by chronic droughts it will help the population to be less dependent on external food supply, and generate jobs.

Analysis of Temperature Field

Below is shown an approach for analyzing how the temperature field depends upon three dimensional variations of thermal conductivity, heat capacity and the viscosity of the flowing water, which depends on the local temperature. It takes into consideration the heat transferred by convection due to water injected to the micro fractured rock. The first part tackles the fluid, the second the rock cooling coupled to the fluid temperature.

Figure 12:
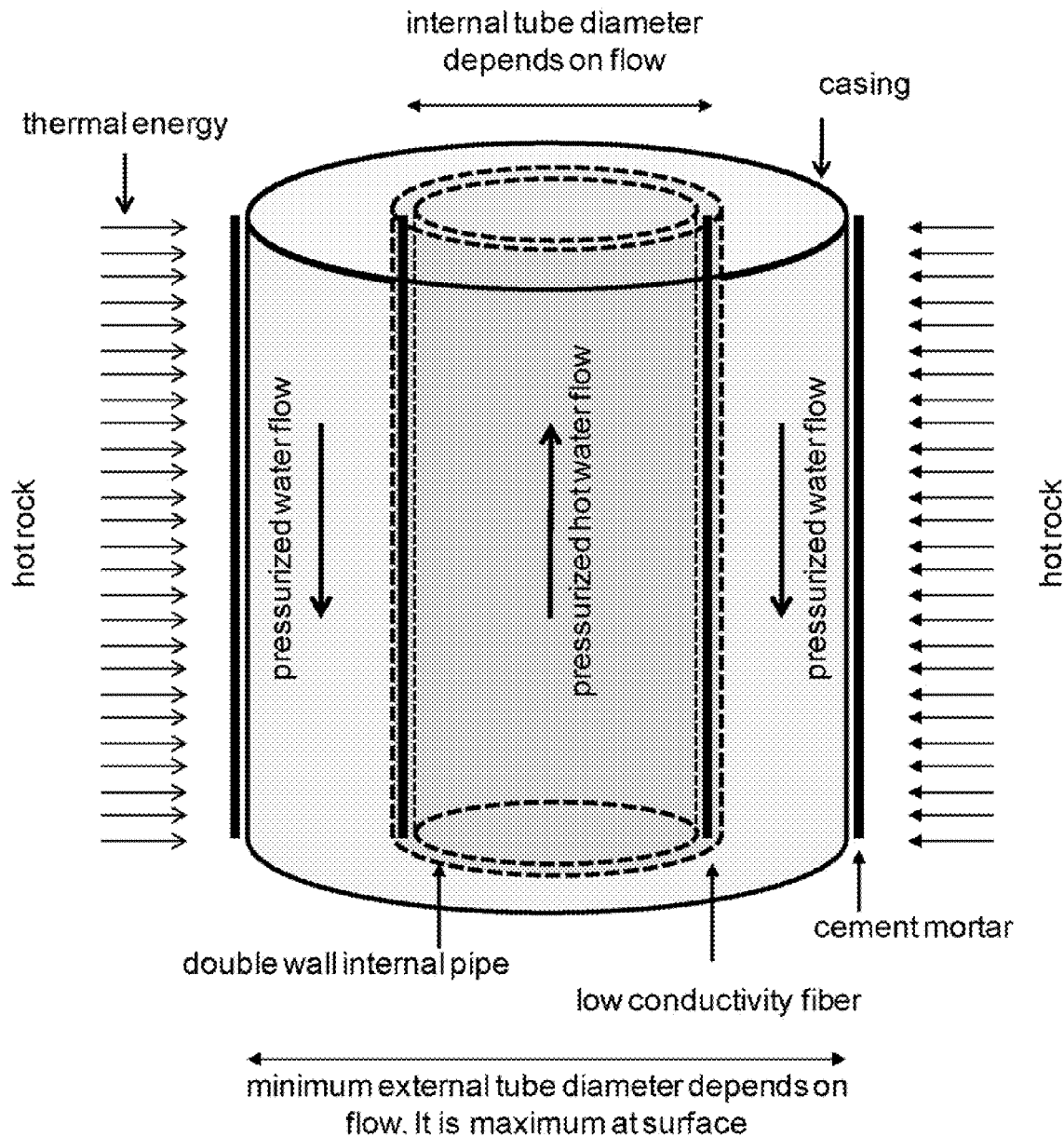
FIG. 12: shows the concentric tubes and thermal transfer from the rock
Figure 13:
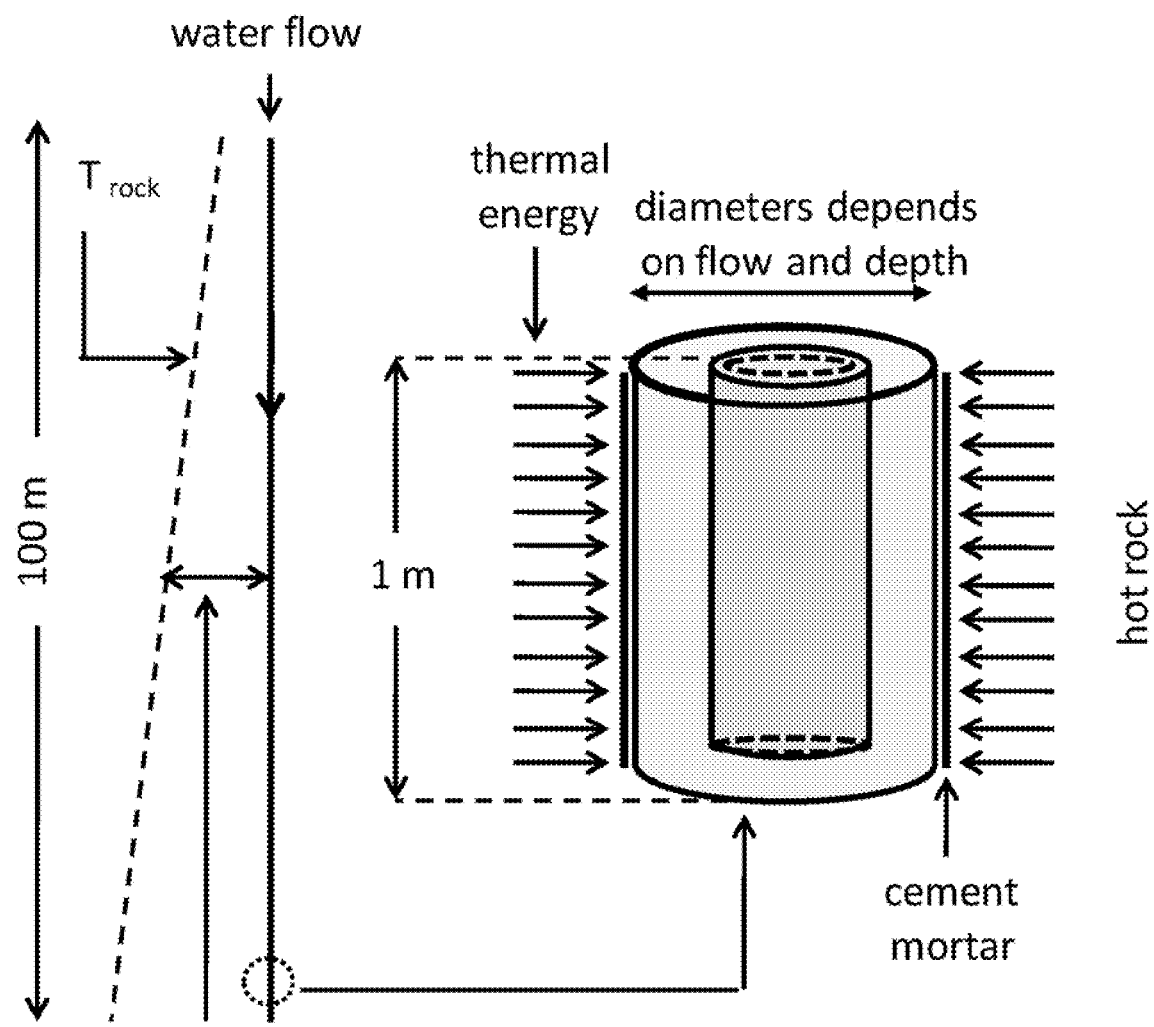
FIG. 13 shows part of an axially symmetric analysis of rock thermal energy transfer to descending water.

The axis symmetric situation of heat transferred from rock to the descending fluid is shown in FIG. 12 for a unit length of the system. FIG. 13 shows a 100 m part of the system where the rock's temperature varies according to the local thermal gradient. The analytical approach is based in a numerical solution of the heat diffusion and the heat motion through the rock. Both domains are coupled to obtain the descending water temperature and the ascending water at surface and to establish the rock cooling due to heat transfer to the fluid.

v=velocity vector of the fluid

T=Temperature

ρ=density $c_p$=specific heat (constant=0.6 w/m° C.)

z=depth $\epsilon$ and $\epsilon_2$ thickness of exterior and interior tubes walls $k_1$ and $k_2$, are conductivities $v_0$ is the water velocity a, b and c are internal and external pipe radii y is horizontal distance from the center of the tubes Applying the diffusion equation to the turbulent flow in the annular space between the two pipes and inner pipe: $v \cdot \nabla T = (k/c_p\rho)\nabla^2 T$. The radial thermal gradient is negligible due to the flow turbulence.

The fluid temperature only depends on depth z. Then: $k(d^2T(z)/dz^2)+c_p\rho v_0(dT(z)/dz)=\dot{w}(z)$ $\dot{w}(z)$=heat transfer rate from external tube wall to descending fluid and from ascending to descending fluid. $\dot{w}(z)[2k_1c/(\epsilon_1c^2-b^2)]T_{roca}z-T_1z+[2k_2b/\epsilon_2c^2-b^2)]T_2z-T_1z$ $$\dot{w}(z)=[2k_1c/\epsilon_1c^2-b^2)]T_{rock}z-T_1z+[2k_2b/(\epsilon_2c^2-b^2)]T_2z-T_1z$$

Then: $v \cdot \nabla T=(k/c_p\rho)$ becomes: $\dot{w}(z)=-[2k_2/(\epsilon_2a]T_2(z)-T_1(z)$.

The heat diffusion is composed of the parts descending and ascending of the flow. Those parts are:

$$K(d^2T_1(z)/dz^2)+(dT_1(z)/dz)=A_1T_{roca}(z)-T_1(z)+A_2T_2(z)-T_1(z) \quad \text{(ascending fluid)}$$

$$K(d^2T_2(z)/dz^2)+(dT_2(z)/dz)=-A_3T_2(z)-T_1(z) \quad \text{(descending fluid)}$$

Where: $K=k/c_p v_0$; $A_1=(1/c_p\rho v_0)[2k_1c/(\epsilon_1c^2-b^2)]$;

$A_2=(1/c_p\rho v_0)[2k_2b/(\epsilon_2c^2-b^2)]$; $A_3=(1/c_p\rho v_0)(2k_2/\epsilon_2a)$ The equations for descending and ascending fluid are coupled and must be solved numerically, in this case using a finite difference net for rings of depth $\Delta z$.

$T_I^1=(\omega/\mu)$ $\omega=A_1T_I^{rock}+A_2T_I^2+T_{I-1}^1[(2K/\Delta z^2)+(1/\Delta z]-T_{I-2}^1[K/\Delta z^2)$ $\mu=K/(\Delta z^2)+(1/\Delta z)+A_1+A_2$ And $T_I^2=(\Phi/\phi)$ $\Phi=A_3T_I^1+T_{I-1}^2[(2K/\Delta z^2)+(1/\Delta z]-T_{I-2}^2(K/\Delta z^2)$ $\phi=K/(\Delta z^2)+(1/\Delta z)+A_1+A_3$ $T_I^1$ and $T_I^2$ are $I_{nth}$ temperatures of the descending and ascending fluid The rock cooling is obtained coupling fluid and rock temperature. Boundary conditions are at the external pipe wall and to a distance d far away from the pipes. Then $\nabla^2 T=0$; this equation becomes: $(1/y)y[(dT(y)/dy)]=0$ and its solution is of the form: $T(y)=C_1\ln(y)+C_2$. Constants $C_1$ and $C_2$ are evaluated at the limit conditions.

To some significant radial distance λ heat horizontal heat flow becomes negligible because the horizontal gradient becomes null: $T_{(y=\lambda)}=T_{unaltered\ rock}$. Then: $-k_3A[dT/dy_{(y=d)}]=\dot{w}$. The rate of heat transfer for steady state in an ring of unit depth is: $\dot{w}=[(2\pi\Delta z k_1)/\ln(d/c)][T(d)-T_1]$. This is solved using the finite difference net composed by rings concentric to the tubes. The following figure show the unaltered rock temperature, the rock temperature reduced by the heat transferred to the water and the ascending water at surface, for a flow of 1 m³/s and a 50° C./km local thermal gradient. The reduced rock temperature is gently curved but most of the graph is almost linear.

Figure 14:
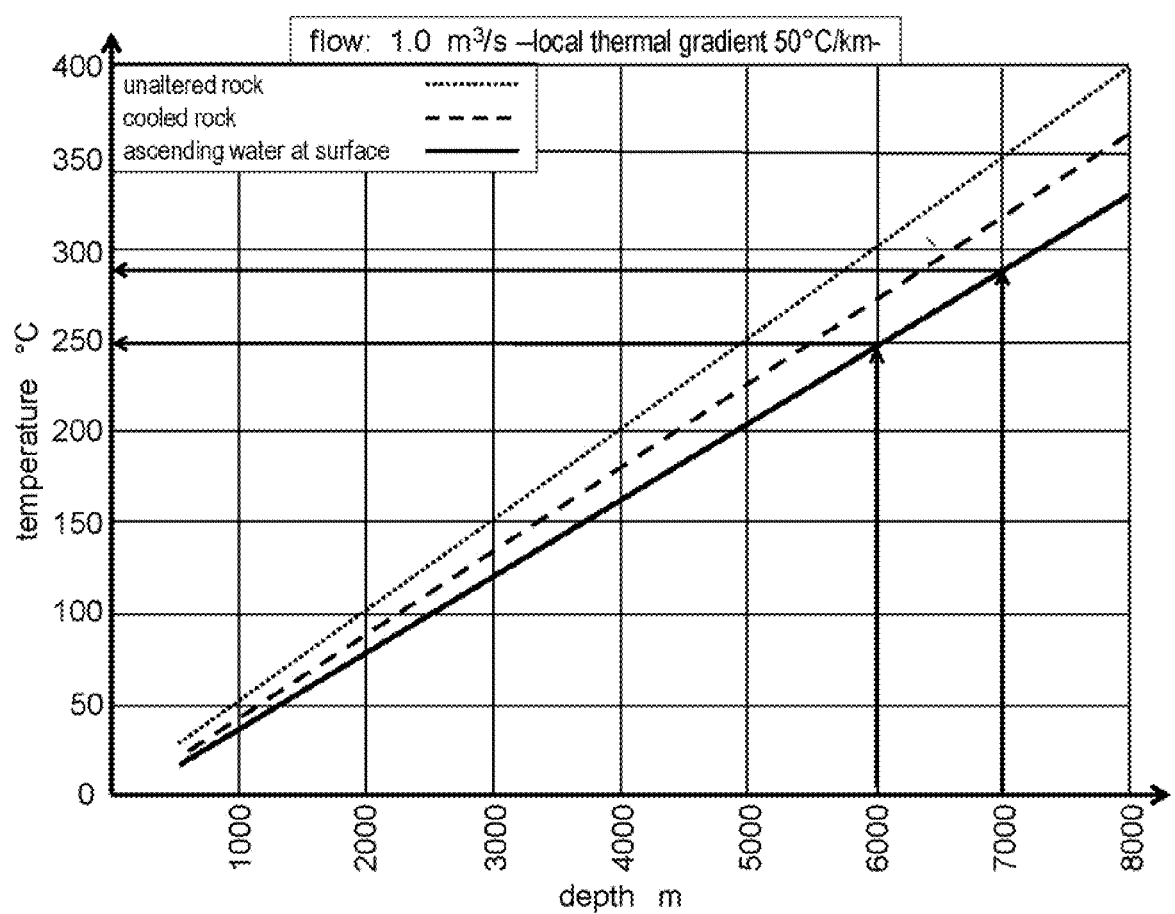
FIG. 14 Shows the unaltered rock temperature, the rock temperature affected by the heat transferred to the descending water and the ascending water temperature at surface for a flow of 1 $m^3$/s and a 50° C./km local thermal gradient, as a function of depth.

Using this approach allows to estimate two main results: First, the rock temperature affected by the heat transfer to the descending water as a function of depth. Second: the ascending fluid temperature at surface, also as a function of well's depth. The unaffected temperature of the rock, shown in FIG. 14 corresponds to the product of the local vertical thermal gradient times the depth.

Variations of the above teachings which are obvious to those of ordinary skill in the art are considered within the scope of the appended claims.

QUOTED REFERENCES

[1] SACHS, Jeffrey "Economía Para un Planeta Abarrotado" Random House Mondadori, 2008 (original title: Common Wealth: Economics for a Crowded Planet)

[2] PRESS, Frank; SIEVER, Raymond "Earth" Second Edition 1978. W. H. Freeman and Company

[3] SKINNER, Brian; PORTER, Stephen "The Dynamic Earth—An Introduction to Physical Geology" Fourth Edition. John Wiley & Sons Inc, 2000

[4] LIYUANG, HE; SHENGBIAO, Hu; SHAOPENG, Huang; WENCAI, Yang; YIYANG, Wang, YUSONG, Yun; SCHUCHUN, Yang "Heat Flow Study at the Continental Scientific Drilling Site: Borehole Temperature, Thermal Conductivity and Radiogenic Heat Production" Journal of Geophysical Research Vol 113, 2008

[5] KARATO, Shun-Ichiro "The Dynamic Structure of the Deep Earth—An Interdisciplinary Approach" Princeton University Press, 2003

[6] ga.water.usgs.gov/edu/earthwherewater.html

[7] ROGERS, Peter "Facing the Fresh Water Crisis" Scientific American, August 2008

[8] UDONO, Ken "Modeling Sea Water Desalination with Waste Incineration Energy Using Dynamic Systems Approach" PhD Thesis, Griffith University, December 2005. Queensland, Australia

[9] NATIONAL PETROLEUM COUNCIL "HARD TRUTHS-Facing the Hard Truths About Energy" Committee on Global Oil and Gas. July 2007

[10] "The Future of Geothermal Energy" Impact of Enhanced Geothermal Systems (EGS) on the United States in the 21$^{st}$ Century. An assessment by a MIT-lead interdisciplinary panel. 2006. http://geothermal.inel.gov

The invention claimed is:

1. A method for heating fluids with earth's internal energy, comprising:
    passing filtered fluid down a drilled well, containing concentric inner and outer tubes that form inner and outer fluid channels, to a depth at which the fluid is heated to a specified temperature and pressure due to heat transferred from surrounding rock,
    passing the heated and pressurized fluid to the inner fluid channel through slots which are located near a lowest part of the inner fluid channel,
    passing the heated and pressurized fluid to the surface by ascending through said inner fluid channel so that the fluid allows for power generation, or for seawater desalination in an integral process with power generation,
    controlling pressure of the ascending fluid with a valve and a pump,
    controlling amplitude of horizontal vibrations of the inner tube with separators attached to an external wall of the inner tube and supports for the inner tube, said inner tube being of double walled construction filled with an insulating material
    wherein said supports for the inner tube include an electro hydraulic braking and positioning subsystem attached to the external wall of the inner tube that operates against an internal wall of the outer tube.

2. The method of claim 1, wherein fluid flows down the outer fluid channel and flows up the inner fluid channel simultaneously.

3. The method of claim 1, where the ascending fluid pressure is controlled by a combination of said pump which is located where the fluid enters the outer fluid channel and a valve which is located where the fluid arrives at the surface.

4. The method of claim 1, wherein said drilled well is cased with steel or stainless steel.

5. The method of claim 1, wherein the drilled well contains a thermally conductive cement contacting both the outer tube and the well walls, to enhance heat transfer from rock to water in the outer tube.

6. The method of claim 1, wherein rock in the earth's crust has been fractured by high pressure water injected through secondary directional wells, thereby enhancing the rate of heat transfer to water in the pipe.

7. The method of claim 1, wherein the temperature of rock is at least 150° C. where the fluid begins to ascend.

8. The method of claim 1, wherein thermal insulation is provided by fiber glass in the double-walled region between the inner tube and the outer tube.

9. The method of claim 1, wherein the drilled well is at least 500 meters deep.

10. The method of claim 1, wherein the drilled well is at least 3,500 meters deep.

11. An apparatus for heating fluids with earth's internal energy, comprising:
    concentric inner and outer tubes which form inner and outer fluid channels for passing filtered fluid down a drilled well, to a depth at which the fluid is heated to a specified temperature and pressure due to heat transferred from surrounding rock,
    slots for passing the heated and pressurized fluid to the inner fluid channel which are located near a lowest part of the inner fluid channel,
    wherein the heated and pressurized fluid ascends to the surface through the inner fluid channel for power generation, or for seawater desalination in an integral process with power generation,
    a valve and a pump for controlling pressure of the ascending fluid,
    separators attached to an external wall of the inner tube and supports for the inner tube, that control amplitude of horizontal vibrations of the inner tube, said inner tube being of doubled walled construction filled with an insulating material,
    wherein said supports for the inner tube include an electro hydraulic braking and positioning subsystem attached to the external wall of the inner tube that operates against an internal wall of the outer tube.

12. The apparatus of claim 11, wherein said insulating material is a low thermal conductivity fiber.

13. The apparatus of claim 11, wherein said electro hydraulic braking and positioning subsystem produces horizontal forces between the outer and inner tubes, allowing installation of the inner tube by increasing or reducing the internal pressure in the electro hydraulic component.

14. The apparatus of claim 11, wherein a shielded electric cable and a signals cable operate subsystems during installation of the inner tube and fix its final position against the outer tube.

15. The apparatus of claim 11, wherein the drilled well contains a thermally conductive cement contacting both the outer tube and the well walls, which enhances heat transfer from rock to water in the outer tube.

* * * * *